(12) United States Patent
Fukuoka et al.

(10) Patent No.: US 11,339,529 B2
(45) Date of Patent: *May 24, 2022

(54) COMPLEXES OF CELLULOSE FIBERS AND INORGANIC PARTICLES

(71) Applicant: NIPPON PAPER INDUSTRIES CO., LTD., Tokyo (JP)

(72) Inventors: Moe Fukuoka, Tokyo (JP); Toru Nakatani, Tokyo (JP); Shisei Goto, Tokyo (JP); Masatoshi Oishi, Tokyo (JP); Hiroaki Noguchi, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 389 days.

This patent is subject to a terminal disclaimer.

(21) Appl. No.: 15/764,136

(22) PCT Filed: Sep. 21, 2016

(86) PCT No.: PCT/JP2016/077902
§ 371 (c)(1),
(2) Date: Jun. 27, 2018

(87) PCT Pub. No.: WO2017/057154
PCT Pub. Date: Apr. 6, 2017

(65) Prior Publication Data
US 2018/0282936 A1  Oct. 4, 2018

(30) Foreign Application Priority Data

Sep. 30, 2015 (JP) ............................. JP2015-195436
Jan. 15, 2016 (JP) ............................. JP2016-006670
Jun. 3, 2016 (JP) ............................. JP2016-111776

(51) Int. Cl.
*D06M 11/83* (2006.01)
*C08L 1/02* (2006.01)
(Continued)

(52) U.S. Cl.
CPC ............... *D06M 11/83* (2013.01); *C08K 3/00* (2013.01); *C08K 3/30* (2013.01); *C08L 1/02* (2013.01);
(Continued)

(58) Field of Classification Search
CPC ..... D06M 11/76; D21H 17/70; D21H 17/675; C01F 5/24
(Continued)

(56) References Cited

U.S. PATENT DOCUMENTS 3,029,181 A     4/1962 Thomsen
5,017,268 A *   5/1991 Clitherow .............. D21H 17/69
                                                 162/146
(Continued)

FOREIGN PATENT DOCUMENTS

AU    2003248412 A1    11/2003
EP       3348519 A1     7/2018
(Continued)

OTHER PUBLICATIONS

International Search Report for Application No. PCT/JP2016/077902, dated Dec. 20, 2016. 2 pages.
(Continued)

*Primary Examiner* — Lynda Salvatore
(74) *Attorney, Agent, or Firm* — McCarter & English, LLP; Steven G. Davis; Wei Song

(57) ABSTRACT

The present invention aims to provide cellulose fibers covered by inorganic particles on the fiber surface. According to the present invention, complexes of a cellulose fiber and inorganic particles wherein 15% or more of the surface of the cellulose fiber is covered by the inorganic particles can be obtained.

14 Claims, 14 Drawing Sheets

(51) Int. Cl.
*C08K 3/00* (2018.01)
*C08K 3/30* (2006.01)
*D06M 11/71* (2006.01)
*D06M 11/79* (2006.01)
*G21F 1/00* (2006.01)
*D06M 101/06* (2006.01)

(52) U.S. Cl.
CPC ............ *D06M 11/71* (2013.01); *D06M 11/79* (2013.01); *G21F 1/00* (2013.01); *C08K 2003/3045* (2013.01); *C08K 2201/005* (2013.01); *C08K 2201/011* (2013.01); *D06M 2101/06* (2013.01)

(58) Field of Classification Search
USPC ............ 428/323, 327, 328, 315.5, 403, 407; 162/141, 146, 158, 162, 168.1, 181.1, 162/181.2
See application file for complete search history.

(56) References Cited

U.S. PATENT DOCUMENTS

| | | | |
|---|---|---|---|
| 5,665,205 | A | 9/1997 | Srivatsa et al. |
| 5,679,220 | A | 10/1997 | Matthew et al. |
| 5,731,080 | A | 3/1998 | Cousin et al. |
| 6,680,086 | B1 | 1/2004 | Nissinen et al. |
| 7,922,991 | B2 * | 4/2011 | Mitsuhashi ............... C05D 5/00 423/430 |
| 9,725,599 | B2 * | 8/2017 | Buri ........................ C09C 1/021 |
| 2005/0129606 | A1 | 6/2005 | Mitsuhashi et al. |
| 2009/0026064 | A1 | 1/2009 | McCausland et al. |
| 2010/0331457 | A1 | 12/2010 | Buri et al. |
| 2011/0000633 | A1 | 1/2011 | Kukkamaki et al. |
| 2015/0167244 | A1 | 6/2015 | Solismaa |
| 2019/0047872 | A1 * | 2/2019 | Fukuoka ................. B01J 19/10 |

FOREIGN PATENT DOCUMENTS

| | | |
|---|---|---|
| JP | 47-41238 B1 | 10/1972 |
| JP | 49-46529 B1 | 12/1974 |
| JP | 6-158585 A | 6/1994 |
| JP | 2002-520503 A | 7/2002 |
| JP | 2003-306325 A | 10/2003 |
| JP | 2003-342894 A | 12/2003 |
| JP | 2005-220055 A | 8/2005 |
| JP | 2005-220082 A | 8/2005 |
| JP | 2008-505829 A | 2/2008 |
| JP | 2010-82776 A | 4/2010 |
| JP | 2011-506789 A | 3/2011 |
| JP | 2013-521417 A | 6/2013 |
| JP | 2013-536329 A | 9/2013 |
| JP | 2014-65752 A | 4/2014 |
| WO | 2005/033403 A1 | 4/2005 |
| WO | 2011/110744 A2 | 9/2011 |
| WO | 2011/151525 A1 | 12/2011 |
| WO | 2015/050126 A1 | 4/2015 |

OTHER PUBLICATIONS

Supplementary European Search Report for Application No. 16851328.1, dated May 27, 2019, 7 pages.
U.S. Appl. No. 15/757,731, filed Mar. 6, 2019, 2019-0047872, Published.
International Search Report for Application No. PCT/JP2016/076467, dated Nov. 15, 2016. 2 pages.
Supplementary European Search Report for Application No. 16844441.2, dated Mar. 20, 2019, 11 pages.

* cited by examiner

COMPLEXES OF CELLULOSE FIBERS AND INORGANIC PARTICLES

CROSS-REFERENCE TO RELATED APPLICATIONS

This application is a U.S. national stage filing, under 35 U.S.C. § 371(c), of International Application No. PCT/JP2016/077902, filed on Sep. 21, 2016, which claims priority to Japanese Patent Application No. 2016-111776, filed on Jun. 3, 2016; Japanese Patent Application No. 2016-006670, filed on Jan. 15, 2016; Japanese Patent Application No. 2015-195436, filed on Sep. 30, 2015. The entire contents of each of the aforementioned applications are incorporated herein by reference.

TECHNICAL FIELD

The present invention relates to complexes of cellulose fibers and inorganic particles as well as processes for preparing them. In particular, the present invention relates to complexes of a cellulose fiber and inorganic particles wherein 15% or more of the surface of the cellulose fiber is covered by the inorganic particles as well as processes for preparing them.

BACKGROUND ART

Cellulose fibers are fibers made of cellulose represented by the formula $(C_6H_{10}O_5)_n$ and are widely used. Cellulose fibers including not only rayon, lyocell, and nitrocellulose but also pulp and cotton are widely applied for cloths, films, papers and the like. In recent years, cellulose nanofibers and the like have also attracted attention so that cellulose fibers find very wide applications.

Cellulose fibers have various properties imparted by the hydroxyl groups on their surface, but the surface may sometimes need to be modified depending on the purposes, and therefore, techniques for modifying the surface of the cellulose fibers have already been developed.

For example, a technique for precipitating inorganic particles on a cellulose fiber is disclosed in PTL 1, which describes a complex comprising a crystalline calcium carbonate mechanically bonded on a fiber. On the other hand, PTL 2 describes a technique for preparing a complex of a pulp and a calcium carbonate by precipitating the calcium carbonate in a suspension of the pulp by the carbonation process. PTL 3 describes a technique for improving the brightness and purity of a waste paper fiber by adding a large amount of a filler for papers and paperboards to the fiber, which comprises sending a slurry of a waste paper pulp to a gas-liquid contactor where the pulp is broken down by contact with a slurry of an alkali salt travelling in a counter-flow direction to the flow direction of the pulp in a contact/breaking zone and sending a suitable reactive gas and mixing it with the precipitating filler to deposit the filler on the surface of the fiber.

In addition, PTLs 4 and 5 disclose techniques for preparing a fiber web in which calcium carbonate has been incorporated efficiently by precipitating the calcium carbonate during the step of forming the fiber web (wet web).

CITATION LIST

Patent Literature

PTL 1: JPA 1994-158585
PTL 2: U.S. Pat. No. 5,679,220
PTL 3: U.S. Pat. No. 5,665,205
PTL 4: JPA 2013-521417
PTL 5: US Patent Publication No. 2011/0000633

SUMMARY OF INVENTION

Technical Problem

The present invention aims to provide cellulose fibers covered by inorganic particles on their surface. In particular, the present invention aims to provide complexes of a cellulose fiber and inorganic particles wherein 15% or more of the surface of the cellulose fiber is covered by the inorganic particles as well as processes for preparing them.

Solution to Problem

The present invention includes, but not limited to, the following:
(1) A complex of a cellulose fiber and inorganic particles, wherein 15% or more of the surface of the cellulose fiber is covered by the inorganic particles.
(2) The complex of (1), wherein the inorganic particles have an average primary particle size of 1 μm or less.
(3) The complex of (1), wherein the inorganic particles have an average primary particle size of 200 nm or less.
(4) The complex of (1), wherein the inorganic particles have an average primary particle size of 50 nm or less.
(5) The complex of any one of (1) to (4), wherein the weight ratio between the cellulose fiber and the inorganic particles is 5/95 to 95/5.
(6) The complex of any one of (1) to (5), wherein the inorganic particles are at least partially a metal salt of calcium, silicic acid, magnesium, barium or aluminum or metal particles containing titanium, copper or zinc.
(7) The complex of any one of (1) to (6), wherein the cellulose fiber is a wood-derived cellulose fiber.
(8) The complex of any one of (1) to (7), wherein the cellulose fiber is a wood-derived pulp.
(9) The complex of any one of (1) to (8), wherein the cellulose fiber is a chemical pulp.
(10) The complex of any one of (1) to (9), wherein the cellulose fiber is a pulverized cellulose.
(11) The complex of any one of (1) to (10), wherein the inorganic particles are barium sulfate.
(12) A radiation shielding material comprising the complex of claim 11).
(13) A process for preparing the complex of any one of (1) to (11), comprising synthesizing inorganic particles in a solution in the presence of a fiber.

Advantageous Effects of Invention

According to the present invention, cellulose fibers covered by inorganic particles on their surface are provided. In particular, the present invention makes it possible to obtain complexes of a cellulose fiber and inorganic particles wherein 15% or more of the surface of the cellulose fiber is covered by the inorganic particles.

In other words, unique complexes combining the properties of both of a cellulose fiber and inorganic particles can be obtained by covering most of the surface of the cellulose fiber with the inorganic particles. For example, fire resistance, opacity (hiding properties) or radiation shielding properties can be conferred on a cellulose fiber by covering the surface of the cellulose fiber with inorganic particles, or adsorbent ability or antimicrobial properties can be conferred on a cellulose fiber by complexing it with an adsorbent material or antimicrobial material. Further, the complexes can be dehydrated/dried into a form that is easy to handle because the particles are adhered to the fiber.

DESCRIPTION OF EMBODIMENTS

Figure 1:
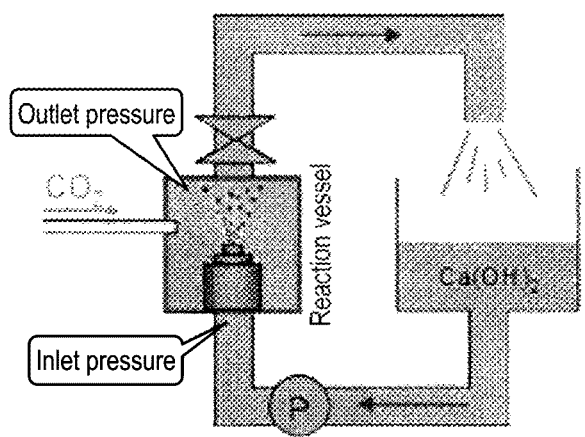
FIG. 1 is a schematic diagram showing the reaction system used in the examples of the present invention.

The present invention relates to cellulose fibers covered by inorganic particles on their surface. In particular, the present invention relates to complexes of a cellulose fiber and inorganic particles wherein 15% or more of the surface of the cellulose fiber is covered by the inorganic particles as well as processes for preparing them.

In the complexes of a cellulose fiber and inorganic particles of the present invention, the inorganic particles rarely drop even by disintegration because the cellulose fiber and the inorganic particles bind together to some extent via hydrogen bonds or the like rather than simply being mixed. The binding strength between a cellulose fiber and inorganic particles in a complex can be evaluated, for example, by a value such as ash retention (%), i.e., [(the ash content of a sheet)/(the ash content of the complex before disintegration)]×100. Specifically, a complex is dispersed in water to a solids content of 0.2% and disintegrated in a standard disintegrator as defined by JIS P 8220-1: 2012 for 5 minutes, and then formed into a sheet through a 150-mesh wire according to JIS P 8222: 1998, and the ash retention of the sheet thus prepared can be used for the evaluation, wherein the ash retention is 20% by mass or more in a preferred embodiment, and the ash retention is 50% by mass or more in a more preferred embodiment.

Cellulose Fibers

In the present invention, inorganic particles are complexed with a cellulose fiber. The fiber forming part of the complexes is not specifically limited so far as it is a cellulose fiber, and examples of fibers that can be used include, without limitation, not only natural cellulose fibers but also regenerated fibers (semisynthetic fibers) such as rayon and lyocell and synthetic fibers and the like. Examples of raw materials of cellulose fibers include pulp fibers (wood pulps and non-wood pulps), cellulose nanofibers, bacterial celluloses, animal-derived celluloses such as Ascidiacea, algae, etc., among which wood pulps may be prepared by pulping wood raw materials. Examples of wood raw materials include softwoods such as *Pinus densiflora, Pinus thunbergii, Abies sachalinensis, Picea jezoensis, Pinus koraiensis, Larix kaempferi, Abies firma, Tsuga sieboldii, Cryptomeria japonica, Chamaecyparis obtusa, Larix kaempferi, Abies veitchii, Picea jezoensis* var. *hondoensis, Thujopsis dolabrata,* Douglas fir (*Pseudotsuga menziesii*), hemlock (*Conium maculatum*), white fir (*Abies concolor*), spruces, balsam fir (*Abies balsamea*), cedars, pines, *Pinus merkusii, Pinus radiata*, and mixed materials thereof; and hardwoods such as *Fagus crenata*, birches, *Alnus japonica*, oaks, *Machilus thunbergii, Castanopsis, Betula platyphylla, Populus nigra* var. *italica,* poplars, *Fraxinus, Populus maximowiczii, Eucalyptus,* mangroves, *Meranti, Acacia* and mixed materials thereof.

The technique for pulping the wood raw materials (plant raw materials) is not specifically limited, and examples include pulping processes commonly used in the papermaking industry. Wood pulps can be classified by the pulping process and include, for example, chemical pulp obtained by digestion via the kraft process, sulfite process, soda process, polysulfide process or the like; mechanical pulp obtained by pulping with a mechanical force such as a refiner, grinder or the like; semichemical pulp obtained by pulping with a mechanical force after a chemical pretreatment; waste paper pulp; deinked pulp and the like. The wood pulps may have been unbleached (before bleaching) or bleached (after bleaching).

Examples of non-wood pulps include cotton, hemp, sisal (*Agave sisalana*), abaca (*Musa textilis*), flax, straw, bamboo, bagas, kenaf, sugar cane, corn, rice straw, *Broussonetia kazinoki×B. papyrifera, Edgeworthia chrysantha* and the like.

The pulp fibers may be unbeaten or beaten, and may be chosen depending on the properties of the complex sheets, but they are preferably beaten. This can be expected to improve the sheet strength and to promote the adhesion of inorganic particles. Moreover, these cellulosic raw materials can be further treated so that they can also be used as pulverized celluloses, chemically modified celluloses such as oxidized celluloses, and cellulose nanofibers (CNFs) (microfibrillated celluloses (MFCs), TEMPO-oxidized CNFs, phosphate esters of CNFs, carboxymethylated CNFs, mechanically ground CNFs and the like). Pulverized celluloses used in the present invention include both of the so-called powdered celluloses and the mechanically ground CNFs described above. The powdered celluloses may be, for example, rod-like crystalline cellulose powders having a certain particle size distribution prepared by purifying/drying and grinding/sieving the pulp slurry obtained by mechanically grinding an untreated accepted pulp fraction or the undecomposed residue obtained after acid hydrolysis of an accepted pulp fraction, or may be commercially available products such as KC FLOCK (from Nippon Paper Industries Co., Ltd.), CEOLUS (from Asahi Kasei Chemicals Corp.), AVICEL (from FMC Corporation) and the like. The degree of polymerization of celluloses in the powdered celluloses is preferably in the order of 100 to 1500, and the powdered celluloses preferably have a crystallinity of 70 to 90% as determined by X-ray diffraction and also preferably have a volume average particle size of 1 μm or more and 100 μm or less as determined by a laser diffraction particle size distribution analyzer. Oxidized celluloses used in the present invention can be obtained by oxidation with an oxidizing agent in water in the presence of an N-oxyl compound and a compound selected from the group consisting of a bromide, an iodide or a mixture thereof, for example. Cellulose nanofibers can be obtained by disintegrating the cellulosic raw materials described above. Disintegration methods that can be used include, for example, mechanically grinding or beating an aqueous suspension or the like of a cellulose or a chemically modified cellulose such as an oxidized cellulose using a refiner, high pressure homogenizer, grinder, single screw or multi-screw kneader, bead mill or the like. Cellulose nanofibers may be prepared by using one or a combination of the methods described above. The fiber diameter of the cellulose nanofibers thus prepared can be determined by electron microscopic observation or the like and falls within the range of, for example, 5 nm to 1000 nm, preferably 5 nm to 500 nm, more preferably 5 nm to 300 nm. During the preparation of the cellulose nanofibers, a given compound can be further added before and/or after the celluloses are disintegrated and/or micronized, whereby it reacts with the cellulose nanofibers to functionalize the hydroxyl groups. Functional groups used for the functionalization include acyl groups such as acetyl, ester, ether, ketone, formyl, benzoyl, acetal, hemiacetal, oxime, isonitrile, allene, thiol, urea, cyano, nitro, azo, aryl, aralkyl, amino, amide, imide, acryloyl, methacryloyl, propionyl, propioloyl, butyryl, 2-butyryl, pentanoyl, hexanoyl, heptanoyl, octanoyl, nonanoyl, decanoyl, undecanoyl, dodecanoyl, myristoyl, palmitoyl, stearoyl, pivaloyl, benzoyl, naphthoyl, nicotinoyl, isonicotinoyl, furoyl and cinnamoyl; isocyanate groups such as 2-methacryloyloxyethyl isocyanoyl; alkyl groups such as methyl, ethyl, propyl, 2-propyl, butyl, 2-butyl, tert-butyl, pentyl, hexyl, heptyl, octyl, nonyl, decyl, undecyl, dodecyl, myristyl, palmityl, and stearyl; oxirane, oxetane, oxyl, thiirane, thietane and the like. Hydrogens in these substituents may be substituted by a functional group such as hydroxyl or carboxyl. Further, the alkyl groups may be partially unsaturated with an unsaturated bond. Compounds used for introducing these functional groups are not specifically limited and include, for example, compounds containing phosphate-derived groups, compounds containing carboxylate-derived groups, compounds containing sulfate-derived groups, compounds containing sulfonate-derived groups, compounds containing alkyl groups, compounds containing amine-derived groups and the like. Phosphate-containing compounds include, but not specifically limited to, phosphoric acid and lithium salts of phosphoric acid such as lithium dihydrogen phosphate, dilithium hydrogen phosphate, trilithium phosphate, lithium pyrophosphate, and lithium polyphosphate. Other examples include sodium salts of phosphoric acid such as sodium dihydrogen phosphate, disodium hydrogen phosphate, trisodium phosphate, sodium pyrophosphate, and sodium polyphosphate. Further examples include potassium salts of phosphoric acid such as potassium dihydrogen phosphate, dipotassium hydrogen phosphate, tripotassium phosphate, potassium pyrophosphate, and potassium polyphosphate. Still further examples include ammonium salts of phosphoric acid such as ammonium dihydrogen phosphate, diammonium hydrogen phosphate, triammonium phosphate, ammonium pyrophosphate, ammonium polyphosphate and the like. Among them, preferred ones include, but not specifically limited to, phosphoric acid, sodium salts of phosphoric acid, potassium salts of phosphoric acid, and ammonium salts of phosphoric acid, and more preferred are sodium dihydrogen phosphate and disodium hydrogen phosphate because they allow phosphate groups to be introduced with high efficiency so that they are convenient for industrial applications. Carboxyl-containing compounds include, but not specifically limited to, dicarboxylic compounds such as maleic acid, succinic acid, phthalic acid, fumaric acid, glutaric acid, adipic acid, and itaconic acid; and tricarboxylic compounds such as citric acid, and aconitic acid. Acid anhydrides of carboxyl-containing compounds include, but not specifically limited to, acid anhydrides of dicarboxylic compounds such as maleic anhydride, succinic anhydride, phthalic anhydride, glutaric anhydride, adipic anhydride, and itaconic anhydride. Derivatives of carboxyl-containing compounds include, but not specifically limited to, imides of acid anhydrides of carboxyl-containing compounds, and derivatives of acid anhydrides of carboxyl-containing compounds. Imides of acid anhydrides of carboxyl-containing compounds include, but not specifically limited to, imides of dicarboxylic compounds such as maleimide, succinimide, and phthalimide. Derivatives of acid anhydrides of carboxyl-containing compounds are not specifically limited. For example, they include acid anhydrides of carboxyl-containing compounds in which hydrogen atoms are at least partially substituted by a substituent (e.g., alkyl, phenyl or the like) such as dimethylmaleic anhydride, diethylmaleic anhydride, and diphenylmaleic anhydride. Among the compounds containing carboxylate-derived groups listed above, preferred ones include, but not specifically limited to, maleic anhydride, succinic anhydride and phthalic anhydride because they are convenient for industrial applications and can be readily gasified. Further, the cellulose nanofibers may be functionalized by a compound physically adsorbed rather than chemically bonded to the cellulose nanofibers. Physically adsorbed compounds include surfactants, which may be anionic, cationic, or nonionic. When the celluloses are functionalized as described above before they are disintegrated and/or ground, these functional groups can be removed, giving back the original hydroxyl groups after they are disintegrated and/or ground. The functionalization as described above can promote disintegration into cellulose nanofibers or help cellulose nanofibers to be mixed with various materials during use.

Composite fibers of cellulose fibers with synthetic fibers can also be used in the present invention, such as composite fibers of cellulose fibers with, for example, polyesters, polyamides, polyolefins, acrylic fibers, glass fiber, carbon fiber, various metal fibers and the like.

The fibers shown above may be used alone or as a mixture of two or more of them. Especially, the complexes preferably comprise a wood pulp or a combination of a wood pulp and a non-wood pulp and/or a synthetic fiber, more preferably a wood pulp alone.

In preferred embodiments, the fiber forming part of the complexes of the present invention is a pulp fiber. Alternatively, fibrous materials collected from waste water of papermaking factories may be supplied to the carbonation reaction of the present invention, for example. Various composite particles including those of various shapes such as fibrous particles can be synthesized by supplying such materials to the reaction vessel.

In the present invention, materials that are not directly involved in the carbonation reaction but incorporated into the product inorganic particles to form composite particles can be used in addition to a fiber. In the present invention, composite particles incorporating inorganic particles, organic particles, polymers or the like in addition to a fiber such as a pulp fiber can be prepared by synthesizing inorganic particles in a solution further containing these materials.

The fiber length of the cellulose fiber to be complexed is not specifically limited, and the average fiber length can be, for example, in the order of 0.1 μm to 15 mm, or may be 1 μm to 12 mm, 100 μm to 10 mm, 500 μm to 8 mm or the like.

The amount of the cellulose fiber to be complexed is not specifically limited so far as it is used in such an amount that 15% or more of the surface of the fiber is covered by inorganic particles, and the weight ratio between the cellulose fiber and the inorganic particles can be, for example, 5/95 to 95/5, or may be 10/90 to 90/10, 20/80 to 80/20, 30/70 to 70/30, or 40/60 to 60/40.

In the complexes of a cellulose fiber of the present invention, 15% or more of the surface of the fiber is covered by inorganic particles, and when the surface of the cellulose fiber is covered at such an area ratio, characteristics attributed to the inorganic particles appear predominantly while characteristics attributed to the cellulose fiber surface diminish.

Inorganic Particles

In the present invention, the inorganic particles to be complexed with the cellulose fiber are not specifically limited, but preferably inorganic particles insoluble or slightly soluble in water. The inorganic particles are preferably insoluble or slightly soluble in water because the inorganic particles are sometimes synthesized in an aqueous system or the complexes are sometimes used in an aqueous system.

As used herein, the term "inorganic particles" refers to a metal or metal compound. In this connection, the metal compound refers to the so-called inorganic salt formed by an ionic bond between a metal cation (e.g., $Na^+$, $Ca^{2+}$, $Mg^{2+}$, $Al^{3+}$, $Ba^{2+}$ or the like) and an anion (e.g., $O^{2-}$, $OH^-$, $CO_3^{2-}$, $PO_4^{3-}$, $SO_4^{2-}$, $NO_3^-$, $Si_2O_3^{2-}$, $SiO_3^{2-}$, $Cl^-$, $F^-$, $S^{2-}$ or the like). These inorganic particles may be synthesized by either gas-liquid or liquid-liquid method. An example of gas-liquid methods is the carbonation method, in which magnesium carbonate can be synthesized by reacting magnesium hydroxide and carbonic acid gas, for example. Examples of liquid-liquid methods include the reaction between an acid (hydrochloric acid, sulfuric acid or the like) and a base (sodium hydroxide, potassium hydroxide or the like) by neutralization; the reaction between an inorganic salt and an acid or a base; and the reaction between inorganic salts. For example, barium hydroxide and sulfuric acid can be reacted to give barium sulfate, or aluminum sulfate and sodium hydroxide can be reacted to give aluminum hydroxide, or calcium carbonate and aluminum sulfate can be reacted to give composite inorganic particles of calcium and aluminum. During the synthesis of inorganic particles as described above, a given metal or metal compound can also be present in the reaction solution, in which case the metal or metal compound is efficiently incorporated into the inorganic particles so that it can be complexed with them. For example, composite particles of calcium phosphate and titanium can be obtained if titanium dioxide is present in the reaction solution when calcium phosphate is synthesized by adding phosphoric acid to calcium carbonate.

Barium sulfate is a crystalline ionic compound represented by the formula $BaSO_4$ and composed of barium ions and sulfate ions, which is often in a plate-like or columnar form and slightly soluble in water. Pure barium sulfate is a colorless crystal, but turns to yellowish brown or black gray and translucent when it contains impurities such as iron, manganese, strontium, calcium or the like. It occurs as a natural mineral or can be synthesized by chemical reaction. Especially, synthetic products obtained by chemical reaction are not only used for medical purposes (radiocontrast agents) but also widely used for paints, plastics, batteries and the like by taking advantage of their chemical stability.

In the present invention, complexes of barium sulfate and a fiber can be prepared by synthesizing barium sulfate in a solution in the presence of the fiber. For example, available methods include the reaction between an acid (sulfuric acid or the like) and a base by neutralization; the reaction between an inorganic salt and an acid or a base; and the reaction between inorganic salts. For example, barium hydroxide and sulfuric acid or aluminum sulfate can be reacted to give barium sulfate, or barium chloride can be added into an aqueous solution containing sulfuric acid to precipitate barium sulfate. Complexes of barium sulfate and a fiber can be conveniently used as radiation shielding materials.

In one preferred embodiment, the complexes of the present invention can be obtained by synthesizing inorganic particles in the presence of a cellulose fiber. This is because the surface of the cellulose fiber provides a suitable site for precipitating the inorganic particles, thus facilitating the synthesis of complexes of the inorganic particles and the cellulose fiber.

In one preferred embodiment, the average primary particle size of the inorganic particles in the complexes of the present invention can be, for example, 1 µm or less, and it is further possible to use inorganic particles having an average primary particle size of 500 nm or less, or inorganic particles having an average primary particle size of 200 nm or less, or even inorganic particles having an average primary particle size of 100 nm or less, or inorganic particles having an average primary particle size of 50 nm or less. On the other hand, the inorganic particles can have an average primary particle size of 10 nm or more. In this context, the average primary particle size can be calculated from electron micrographs.

Further, the inorganic particles in the complexes of the present invention may take the form of secondary particles resulting from the aggregation of fine primary particles, wherein the secondary particles can be produced to suit the intended purposes via an aging process or aggregates can be broken down by grinding. Grinding means include ball mills, sand grinder mills, impact mills, high pressure homogenizers, low pressure homogenizers, Dyno mills, ultrasonic mills, Kanda grinders, attritors, millstone type mills, vibration mills, cutter mills, jet mills, breakers, beaters, single screw extruders, twin screw extruders, ultrasonic stirrers, juicers/mixers for home use, etc.

The complexes obtained by the present invention can be used in various shapes including, for example, powders, pellets, moldings, aqueous suspensions, pastes, sheets and other shapes. Further, the complexes can be used as main components with other materials to form molded products such as moldings and particles or pellets. The dryer used to dry the complexes to form powders is not specifically limited either, and air-flow dryers, band dryers, spray dryers and the like can be suitably used, for example.

The complexes obtained by the present invention can be used for various applications and they can be widely used for any applications including, for example, papers, fibers, cellulosic composite materials, filter materials, paints, plastics and other resins, rubbers, elastomers, ceramics, glasses, tires, construction materials (asphalt, asbestos, cement, boards, concrete, bricks, tiles, plywoods, fiber boards and the like), various carriers (catalyst carriers, drug carriers, agrochemical carriers, microbial carriers and the like), adsorbents (decontaminants, deodorants, dehumidifying agents and the like), anti-wrinkle agents, clay, abrasives, modifiers, repairing materials, thermal insulation materials, damp proofing materials, water repellent materials, waterproofing materials, light shielding materials, sealants, shielding materials, insect repellents, adhesives, inks, cosmetics, medical materials, paste materials, discoloration inhibitors, food additives, tablet excipients, dispersants, structuring agents, water retention agents, filter aids, oil rectification additives, oil processing additives, oil reforming additives, electromagnetic wave absorbers, insulating materials, acoustic insulation materials, vibration damping materials, semiconductor sealing materials, radiation shielding materials, cosmetics, fertilizers, feedstuffs, perfumes, additives for paints and adhesives, flame retardant materials, sanitary products (disposable diapers, sanitary napkins, incontinence pads, nursing pads, etc.) and the like. They also can be used for various fillers, coating agents and the like in the applications mentioned above. The complexes of the present invention may also be applied for papermaking purposes including, for example, printing papers, newsprint papers, inkjet printing papers, PPC papers, kraft papers, woodfree papers, coated papers, coated fine papers, wrapping papers, thin papers, colored woodfree papers, castcoated papers, carbonless copy papers, label papers, heat-sensitive papers, various fancy papers, water-soluble papers, release papers, process papers, hanging base papers, incombustible papers, flame retardant papers, base papers for laminated boards, printed electronics papers, battery separators, cushion papers, tracing papers, impregnated papers, papers for ODP, building papers, papers for decorative building materials, envelope papers, papers for tapes, heat exchange papers, chemical fiber papers, aseptic papers, water resistant papers, oil resistant papers, heat resistant papers, photocatalytic papers, cosmetic papers (facial blotting papers and the like), various sanitary papers (toilet papers, facial tissues, wipers, diapers, menstrual products and the like), cigarette rolling papers, paperboards (liners, corrugating media, white paperboards and the like), base papers for paper plates, cup papers, baking papers, abrasive papers, synthetic papers and the like. Thus, the present invention makes it possible to provide complexes of inorganic particles having a small particle size and a narrow particle size distribution and a fiber so that they can exhibit different properties from those of conventional inorganic fillers having a particle size of more than 1 μm. Further, the complexes of inorganic particles with a fiber can be formed into sheets in which the inorganic particles are not only more readily retained but also uniformly dispersed without being aggregated in contrast to those in which inorganic particles are simply added to a fiber. In one preferred embodiment, the inorganic particles in the present invention are not only adhered to the outer surface and the inside of the lumen of the fiber but also produced within microfibrils, as shown by the results of electron microscopic observation.

Further, the complexes obtained by the present invention can be used typically in combination with particles known as inorganic fillers and organic fillers or various fibers. For example, inorganic fillers include calcium carbonate (precipitated calcium carbonate, ground calcium carbonate), magnesium carbonate, barium carbonate, aluminum hydroxide, calcium hydroxide, magnesium hydroxide, zinc hydroxide, clay (kaolin, calcined kaolin, delaminated kaolin), talc, zinc oxide, zinc stearate, titanium dioxide, silica products prepared from sodium silicate and a mineral acid (white carbon, silica/calcium carbonate complexes, silica/titanium dioxide complexes), terra alba, bentonite, diatomaceous earth, calcium sulfate, zeolite, inorganic fillers recycled from ash obtained in a deinking process and inorganic fillers consisting of complexes of ash formed with silica or calcium carbonate during recycling, etc. In the calcium carbonate-silica complexes, amorphous silicas such as white carbon may also be used in addition to calcium carbonate and/or precipitated calcium carbonate-silica complexes. Organic fillers include urea-formaldehyde resins, polystyrene resins, phenol resins, hollow microparticles, acrylamide complexes, wood-derived materials (microfibers, microfibrillar fibers, kenaf powders), modified/insolubilized starches, ungelatinized starches and the like. Fibers that can be used include, without limitation, not only natural fibers such as celluloses but also synthetic fibers artificially synthesized from raw materials such as petroleum, regenerated fibers (semisynthetic fibers) such as rayon and lyocell, and even inorganic fibers and the like. In addition to the examples mentioned above, natural fibers include protein fibers such as wool and silk yarns and collagen fibers; complex carbohydrate fibers such as chitin-chitosan fibers and alginate fibers and the like. Examples of cellulosic raw materials include pulp fibers (wood pulps and non-wood pulps), bacterial celluloses, animal-derived celluloses such as Ascidiacea, algae, etc., among which wood pulps may be prepared by pulping wood raw materials. Examples of wood raw materials include softwoods such as *Pinus densiflora, Pinus thunbergii, Abies sachalinensis, Picea jezoensis, Pinus koraiensis, Larix kaempferi, Abies firma, Tsuga sieboldii, Cryptomeria japonica, Chamaecyparis obtusa, Larix kaempferi, Abies veitchii, Picea jezoensis* var. *hondoensis, Thujopsis dolabrata*, Douglas fir (*Pseudotsuga menziesii*), hemlock (*Conium maculatum*), white fir (*Abies concolor*), spruces, balsam fir (*Abies balsamea*), cedars, pines, *Pinus merkusii, Pinus radiata*, and mixed materials thereof; and hardwoods such as *Fagus crenata*, birches, *Alnus japonica*, oaks, *Machilus thunbergii, Castanopsis, Betula platyphylla, Populus nigra* var. *italica*, poplars, *Fraxinus, Populus maximowiczii, Eucalyptus*, mangroves, *Meranti, Acacia* and mixed materials thereof. The technique for pulping the wood raw materials is not specifically limited, and examples include pulping processes commonly used in the papermaking industry. Wood pulps can be classified by the pulping process and include, for example, chemical pulp obtained by digestion via the kraft process, sulfite process, soda process, polysulfide process or the like; mechanical pulp obtained by pulping with a mechanical force such as a refiner, grinder or the like; semichemical pulp obtained by pulping with a mechanical force after a chemical pretreatment; waste paper pulp; deinked pulp and the like. The wood pulps may have been unbleached (before bleaching) or bleached (after bleaching). Examples of non-wood pulps include cotton, hemp, sisal (*Agave sisalana*), abaca (*Musa textilis*), flax, straw, bamboo, bagas, kenaf, sugar cane, corn, rice straw, *Broussonetia kazinoki×B. papyrifera, Edgeworthia chrysantha* and the like. The wood pulps and non-wood pulps may be unbeaten or beaten. Moreover, these cellulosic raw materials can be further treated so that they can also be used as pulverized celluloses such as powdered celluloses, chemically modified celluloses such as oxidized celluloses, and cellulose nanofibers (CNFs) (microfibrillated celluloses (MFCs), TEMPO-oxidized CNFs, phosphate esters of CNFs, carboxymethylated CNFs, mechanically ground CNFs). Synthetic fibers include polyesters, polyamides, polyolefins, and acrylic fibers; semisynthetic fibers include rayon, acetate and the like; and inorganic fibers include glass fiber, carbon fiber, various metal fibers and the like. All these may be used alone or as a combination of two or more of them.

The average particle size or shape or the like of the inorganic particles forming part of the complexes of the present invention can be identified by electron microscopic observation. Further, inorganic particles having various sizes or shapes can be complexed with a fiber by controlling the conditions under which the inorganic particles are synthesized.

Processes for preparing the complexes of the present invention essentially comprise synthesizing inorganic particles in a solution containing a fiber. For example, the complexes may be synthesized by stirring/mixing a solution containing a fiber and a precursor of inorganic particles in an open reaction vessel or injecting an aqueous suspension containing a fiber and a precursor of inorganic particles into a reaction vessel. As described later, inorganic particles may be synthesized in the presence of cavitation bubbles generated during the injection of an aqueous suspension of a precursor of the inorganic particles into a reaction vessel.

When one of precursors of inorganic particles is alkaline, complexes of the inorganic particles and a fiber can be obtained efficiently by dispersing the fiber in a solution of the alkaline precursor in advance because the fiber can be swollen. The reaction can be started after swelling of the fiber has been promoted by stirring for 15 minutes or more after mixing, or the reaction can be started immediately after mixing. When a material liable to interact with celluloses such as aluminum sulfate (alum, polyaluminum chloride or the like) is used as a part of precursors of inorganic particles, the proportion of the inorganic particles adhered to the fiber may be improved by mixing the precursor containing aluminum sulfate with the fiber in advance.

In the present invention, a liquid may be injected under conditions where cavitation bubbles are generated in a reaction vessel or a liquid may be injected under conditions where cavitation bubbles are not generated. The reaction vessel is preferably a pressure vessel in either case. As used herein, the term "pressure vessel" refers to a vessel that can withstand a pressure of 0.005 MPa or more. Under conditions where cavitation bubbles are not generated, the pressure in the pressure vessel is preferably 0.005 MPa or more and 0.9 MPa or less expressed in static pressure.

(Cavitation Bubbles)

For synthesizing the complexes of the present invention, inorganic particles can be precipitated in the presence of cavitation bubbles. As used herein, the term "cavitation" refers to a physical phenomenon in which bubbles are generated and disappear in the flow of a fluid in a short time due to a pressure difference. The bubbles generated by cavitation (cavitation bubbles) develop from very small "bubble nuclei" of 100 μm or less present in a liquid when the pressure drops below the saturated vapor pressure in the fluid only for a very short time.

In the present invention, cavitation bubbles can be generated in a reaction vessel by known methods. For example, it is possible to generate cavitation bubbles by injecting a fluid under high pressure, or by stirring at high speed in a fluid, or by causing an explosion in a fluid, or by using an ultrasonic vibrator (vibratory cavitation) or the like.

Particularly in the present invention, cavitation bubbles are preferably generated by injecting a fluid under high pressure because the cavitation bubbles are readily generated and controlled. In this embodiment, a liquid to be injected is compressed by using a pump or the like and injected at high speed through a nozzle or the like, whereby cavitation bubbles are generated simultaneously with the expansion of the liquid itself due to a very high shear force and a sudden pressure drop near the nozzle. Fluid jetting allows cavitation bubbles to be generated with high efficiency, whereby the cavitation bubbles have stronger collapse impact. In the present invention, inorganic particles are synthesized in the presence of controlled cavitation bubbles, clearly in contrast to the cavitation bubbles spontaneously occurring in fluid machinery and causing uncontrollable risks.

In the present invention, the reaction solution of a raw material or the like can be directly used as a jet liquid to generate cavitation, or some fluid can be injected into the reaction vessel to generate cavitation bubbles. The fluid forming a liquid jet may be any of a liquid, a gas, or a solid such as powder or pulp or a mixture thereof so far as it is in a flowing state. Moreover, another fluid such as carbonic acid gas can be added as an additional fluid to the fluid described above, if desired. The fluid described above and the additional fluid may be injected as a homogeneous mixture or may be injected separately.

The liquid jet refers to a jet of a liquid or a fluid containing solid particles or a gas dispersed or mixed in a liquid, such as a liquid jet containing a slurry of a pulp or inorganic particles and bubbles. The gas here may contain bubbles generated by cavitation.

The flow rate and pressure are especially important for cavitation because it occurs when a liquid is accelerated and a local pressure drops below the vapor pressure of the liquid. Therefore, the cavitation number σ, which is a basic dimensionless number expressing a cavitation state, is defined by equation 1 below ("New Edition Cavitation: Basics and Recent Advance", Written and Edited by Yoji Katoh, Published by Makishoten, 1999).

[Formula 1]

$$\sigma = \frac{p_\infty - p_v}{\frac{1}{2}\rho U_\infty^2} \qquad (1)$$

If the cavitation number here is high, it means that the flow site is in a state where cavitation is less likely to occur. Especially when cavitation is generated through a nozzle or an orifice tube as in the case of a cavitation jet, the cavitation number σ can be rewritten by equation (2) below where $p_1$ is the pressure upstream of the nozzle, $p_2$ is the pressure downstream of the nozzle, and $p_v$ is the saturated vapor pressure of sample water, and the cavitation number σ can be further approximated as shown by equation (2) below because the pressure difference between $p_1$, $p_2$ and $p_v$ is significant in a cavitation jet so that $p_1 \gg p_2 \gg P_v$ (H. Soyama, J. Soc. Mat. Sci. Japan, 47 (4), 381 1998).

[Formula 2]

$$\sigma = \frac{p_2 - p_v}{p_1 - p_2} \cong \frac{p_2}{p_1} \qquad (2)$$

Cavitation conditions in the present invention are as follow: the cavitation number σ defined above is desirably 0.001 or more and 0.5 or less, preferably 0.003 or more and 0.2 or less, especially preferably 0.01 or more and 0.1 or less. If the cavitation number σ is less than 0.001, little benefit is attained because the pressure difference from the surroundings is small when cavitation bubbles collapse, but if it is greater than 0.5, the pressure difference in the flow is too small to generate cavitation.

When cavitation is generated by emitting a jetting liquid through a nozzle or an orifice tube, the pressure of the jetting liquid (upstream pressure) is desirably 0.01 MPa or more and 30 MPa or less, preferably 0.7 MPa or more and 20 MPa or less, more preferably 2 MPa or more and 15 MPa or less. If the upstream pressure is less than 0.01 MPa, little benefit is attained because a pressure difference is less likely to occur from the downstream pressure. If the upstream pressure is higher than 30 MPa, a special pump and pressure vessel are required and energy consumption increases, leading to cost disadvantages. On the other hand, the pressure in the vessel (downstream pressure) is preferably 0.05 MPa or more and 0.9 MPa or less expressed in static pressure. Further, the ratio between the pressure in the vessel and the pressure of the jetting liquid is preferably in the range of 0.001 to 0.5.

In the present invention, inorganic particles can also be synthesized by injecting a jetting liquid under conditions where cavitation bubbles are not generated. Specifically, the pressure of the jetting liquid (upstream pressure) is controlled at 2 MPa or less, preferably 1 MPa or less, while the pressure of the jetting liquid (downstream pressure) is released, more preferably 0.05 MPa or less.

The jet flow rate of the jetting liquid is desirably in the range of 1 msec or more and 200 msec or less, preferably in the range of 20 msec or more and 100 msec or less. If the jet flow rate is less than 1 msec, little benefit is attained because the pressure drop is too small to generate cavitation. If it is greater than 200 msec, however, special equipment is required to generate high pressure, leading to cost disadvantages.

In the present invention, cavitation may be generated in a reaction vessel where inorganic particles are synthesized. The process can be run in one pass, or can be run through a necessary number of cycles. Further, the process can be run in parallel or in series using multiple generating means.

Liquid injection for generating cavitation may take place in a vessel open to the atmosphere, but preferably takes place within a pressure vessel to control cavitation.

When cavitation is generated by liquid injection, the solids content of the reaction solution is preferably 30% by weight or less, more preferably 20% by weight or less. This is because cavitation bubbles are more likely to homogeneously act on the reaction system at such levels. Further, the solids content of the aqueous suspension of slaked lime forming the reaction solution is preferably 0.1% by weight or more to improve the reaction efficiency.

During the synthesis of a complex of calcium carbonate and a cellulose fiber in the present invention, for examples, the pH of the reaction solution is basic at the beginning of the reaction, but changes to neutral as the carbonation reaction proceeds. Thus, the reaction can be controlled by monitoring the pH of the reaction solution.

In the present invention, stronger cavitation can be generated by increasing the jetting pressure of the liquid because the flow rate of the jetting liquid increases and accordingly the pressure decreases. Moreover, the impact force can be stronger by increasing the pressure in the reaction vessel because the pressure in the region where cavitation bubbles collapse increases and the pressure difference between the bubbles and the surroundings increases so that the bubbles vigorously collapse. This also helps to promote the dissolution and dispersion of carbonic acid gas introduced. The reaction temperature is preferably 0° C. or more and 90° C. or less, especially preferably 10° C. or more and 60° C. or less. Given that the impact force is generally thought to be maximal at the midpoint between the melting point and the boiling point, the temperature is suitably around 50° C. in cases of aqueous solutions, though significant benefits can be obtained even at lower temperatures within the ranges defined above because there is no influence of vapor pressure.

In the the present invention, the energy required for generating cavitation can be reduced by adding a surfactant. Surfactants that may be used include known or novel surfactants, e.g., nonionic surfactants, anionic surfactants, cationic surfactants and amphoteric surfactants such as fatty acid salts, higher alkyl sulfates, alkyl benzene sulfonates, higher alcohols, alkyl phenols, alkylene oxide adducts of fatty acids and the like. These may be used alone or as a mixture of two or more components. They may be added in any amount necessary for lowering the surface tension of the jetting liquid and/or target liquid.

Synthesis of Complexes of Inorganic Particles and Cellulose Fibers

In one embodiment of the present invention wherein a complex can be synthesized by synthesizing inorganic particles in a solution containing a cellulose fiber, the inorganic particles can be synthesized by a known method. If a calcium carbonate is to be synthesized, the calcium carbonate can be synthesized by, for example, the carbonation process, soluble salt reaction, lime-soda process, soda process or the like, and in a preferred embodiment, the calcium carbonate is synthesized by the carbonation process.

Typically, the preparation of a calcium carbonate by the carbonation process uses lime as a calcium source to synthesize the calcium carbonate via a slaking step in which water is added to quick lime CaO to give slaked lime $Ca(OH)_2$ and a carbonation step in which carbonic acid gas $CO_2$ is injected into the slaked lime to give the calcium carbonate $CaCO_3$. During then, the suspension of slaked lime prepared by adding water to quick lime may be passed through a screen to remove less soluble lime particles contained in the suspension. Alternatively, slaked lime may be used directly as a calcium source. In cases where a calcium carbonate is synthesized by the carbonation process in the present invention, the carbonation reaction may be performed in the presence of cavitation bubbles.

Typically known reactors for preparing a calcium carbonate by the carbonation process (carbonation reactors: carbonators) include gas injection carbonators and mechanically stirred carbonators. The gas injection carbonators inject carbonic acid gas into a carbonation reactor containing a suspension of slaked lime (milk of lime) to react the slaked lime with the carbonic acid gas, but it is difficult to uniformly and precisely control the size of bubbles simply by injecting carbonic acid gas, which imposes limitations in terms of the reaction efficiency. On the other hand, the mechanically stirred carbonators are equipped with a stirrer inside the carbonators and introduce carbonic acid gas near the stirrer, thereby dispersing the carbonic acid gas as fine bubbles to improve the efficiency of the reaction between the slaked lime and the carbonic acid gas ("Handbook of Cement, Gypsum and Lime" published by GIHODO SHUPPAN Co., Ltd., 1995, page 495).

If the reaction solution had a high concentration or the carbonation reaction proceeded in cases where stirring took place with a stirrer provided within a carbonation reactor as in mechanically stirred carbonators, however, the resistance of the reaction solution increased to make it difficult to sufficiently stir it and therefore make it difficult to exactly control the carbonation reaction or the stirrer is subjected to a considerable load for sufficient stirring, thus leading to energy disadvantages. Further, a gas injection port is located at a lower site of the carbonator, and blades of the stirrer are provided near the bottom of the carbonator to allow better stirring. Less soluble lime screen residues rapidly precipitate and always stay at the bottom, thereby blocking the gas injection port or disturbing the balance of the stirrer. Moreover, conventional methods required not only a carbonator but also a stirrer and equipment for introducing carbonic acid gas into the carbonator, which also incurred much costs of equipment. In the mechanically stirred carbonators, the carbonic acid gas supplied near the stirrer is dispersed as fine bubbles by the stirrer to improve the efficiency of the reaction between the slaked lime and the carbonic acid gas, but the carbonic acid gas could not be dispersed as sufficiently fine bubbles if the concentration of the reaction solution was high or in other cases and it was also sometimes difficult to precisely control the morphology or the like of the produced calcium carbonate in the carbonation reaction. In the present invention, a calcium carbonate is synthesized in the presence of cavitation bubbles, whereby the carbonation reaction proceeds efficiently and uniform calcium carbonate microparticles can be prepared. Especially, the use of a jet cavitation allows sufficient stirring without any mechanical stirrer such as blades. In the present invention, previously known reactors can be used, including the gas injection carbonators and the mechanically stirred carbonators as described above without any inconveniences as a matter of course, and these reactors may be combined with a jet cavitation using a nozzle or the like.

When a calcium carbonate is synthesized by the carbonation process, the aqueous suspension of slaked lime preferably has a solids content in the order of 0.1 to 40% by weight, more preferably 0.5 to 30% by weight, still more preferably 1 to 20% by weight. If the solids content is low, the reaction efficiency decreases and the production cost increases, but if the solids content is too high, the flowability decreases and the reaction efficiency decreases. In the present invention, calcium carbonate is synthesized in the presence of cavitation bubbles so that the reaction solution and carbonic acid gas can be mixed well even if a suspension (slurry) having a high solids content is used.

The aqueous suspension containing slaked lime that can be used includes those commonly used for the synthesis of calcium carbonate, and can be prepared by, for example, mixing slaked lime with water or by slaking (digesting) quick lime (calcium oxide) with water. The slaking conditions include, but not specifically limited to, a CaO concentration of 0.1% by weight or more, preferably 1% by weight or more, and a temperature of 20 to 100° C., preferably 30 to 100° C., for example. Further, the average residence time in the slaking reactor (slaker) is not specifically limited either, but can be, for example, 5 minutes to 5 hours, preferably 2 hours or less. It should be understood that the slaker may be batch or continuous. It should be noted that, in the present invention, the carbonation reactor (carbonator) and the slaking reactor (slaker) may be provided separately, or one reactor may serve as both carbonation reactor and slaking reactor.

The present invention uses water for preparing the suspension or for other purposes, including common tap water, industrial water, groundwater, well water and the like, and also can conveniently use ion-exchanged water, distilled water, ultrapure water, industrial waste water, and the water resulting from the separation/dehydration of the calcium carbonate slurry obtained in the carbonation step.

Further in the present invention, the reaction solution can be circulated from the reaction vessel and used. If the reaction solution is circulated in this way to increase contacts between the reaction solution and carbonic acid gas, the reaction efficiency increases and desired inorganic particles can be easily obtained.

In the present invention, a gas such as carbon dioxide (carbonic acid gas) is injected into a reaction vessel where it can be mixed with the reaction solution. According to the present invention, the reaction can be performed with good efficiency because carbonic acid gas can be supplied to the reaction solution without any gas feeder such as a fan, blower or the like, and the carbonic acid gas is finely dispersed by cavitation bubbles.

In the present invention, the carbon dioxide concentration of the gas containing carbon dioxide is not specifically limited, but the carbon dioxide concentration is preferably higher. Further, the amount of carbonic acid gas introduced into the injector is not limited and can be selected as appropriate, but carbonic acid gas is preferably used at a flow rate of 100 to 10000 L/hr per kg of slaked lime, for example.

The gas containing carbon dioxide of the present invention may be substantially pure carbon dioxide gas or a mixture with another gas. For example, a gas containing an inert gas such as air or nitrogen in addition to carbon dioxide gas can be used as the gas containing carbon dioxide. Further, gases containing carbon dioxide other than carbon dioxide gas (carbonic acid gas) that can be conveniently used include exhaust gases discharged from incinerators, coal-fired boilers, heavy oil-fired boilers and the like in papermaking factories. In addition, the carbonation reaction can also be performed using carbon dioxide generated from the lime calcination process.

For preparing the complexes of the present invention, various known auxiliaries can also be added. For example, chelating agents can be added, specifically including polyhydroxycarboxylic acids such as citric acid, malic acid, and tartaric acid; dicarboxylic acids such as oxalic acid; sugar acids such as gluconic acid; aminopolycarboxylic acids such as iminodiacetic acid and ethylenediamine tetraacetic acid and alkali metal salts thereof; alkali metal salts of polyphosphoric acids such as hexametaphosphoric acid and tripolyphosphoric acid; amino acids such as glutamic acid and aspartic acid and alkali metal salts thereof; ketones such as acetylacetone, methyl acetoacetate and allyl acetoacetate; sugars such as sucrose; and polyols such as sorbitol. Surface-treating agents can also be added, including saturated fatty acids such as palmitic acid and stearic acid; unsaturated fatty acids such as oleic acid and linoleic acid; alicyclic carboxylic acids; resin acids such as abietic acid; as well as salts, esters and ethers thereof; alcoholic activators, sorbitan fatty acid esters, amide- or amine-based surfactants, polyoxyalkylene alkyl ethers, polyoxyethylene nonyl phenyl ether, sodium alpha-olefin sulfonate, long-chain alkylamino acids, amine oxides, alkylamines, quaternary ammonium salts, aminocarboxylic acids, phosphonic acids, polycarboxylic acids, condensed phosphoric acids and the like. Further, dispersants can also be used, if desired. Such dispersant include, for example, sodium polyacrylate, sucrose fatty acid esters, glycerol esters of fatty acids, ammonium salts of acrylic acid-maleic acid copolymers, methacrylic acid-naphthoxypolyethylene glycol acrylate copolymers, ammonium salts of methacrylic acid-polyethylene glycol monomethacrylate copolymers, polyethylene glycol monoacrylate and the like. These can be used alone or as a combination of two or more of them. They may be added before or after the carbonation reaction. Such additives can be added preferably in an amount of 0.001 to 20%, more preferably 0.1 to 10% of inorganic particles.

The reaction conditions under which complexes are synthesized in the present invention are not specifically limited, and appropriately selected depending on the purposes. For example, the temperature of the synthesis reaction can be 0 to 90° C., preferably 10 to 70° C. The reaction temperature can be controlled by regulating the temperature of the reaction solution using a temperature controller, and if the temperature is low, the reaction efficiency decreases and the cost increases, but if it exceeds 90° C., coarse inorganic particles tend to increase.

Further in the present invention, the reaction can be a batch reaction or a continuous reaction. Typically, the reaction is preferably performed as a batch process because of the convenience in removing residues after the reaction. The scale of the reaction is not specifically limited, and can be 100 L or less, or more than 100 L. The volume of the reaction vessel can be, for example, in the order of 10 L to 100 L, or may be in the order of 100 L to 1000 L.

Further, the reaction can be controlled by, for example, monitoring the pH of the reaction solution, and the reaction can be performed until the pH reaches, for example, less than pH 9, preferably less than pH 8, more preferably around pH 7 depending on the pH profile of the reaction solution if the reaction is a carbonation reaction of calcium carbonate.

Alternatively, the reaction can be controlled by monitoring the conductivity of the reaction solution. The carbonation reaction is preferably performed until the conductivity drops to 1 mS/cm or less if the reaction is a carbonation reaction of calcium carbonate.

Furthermore, the reaction can also be controlled simply by the reaction period, and specifically it can be controlled by adjusting the period during which the reactants stay in the reaction vessel. Additionally, the reaction can also be controlled in the present invention by stirring the reaction solution in the reaction vessel or performing the reaction as a multistage reaction.

In the present invention, the reaction product complex is obtained as a suspension so that it can be stored in a storage tank or subjected to processing such as concentration, dehydration, grinding, classification, aging, or dispersion, as appropriate. These can be accomplished by known processes, which may be appropriately selected taking into account the purposes, energy efficiency and the like. For example, the concentration/dehydration process is performed by using a centrifugal dehydrator, thickener or the like. Examples of such centrifugal dehydrators include decanters, screw decanters and the like. If a filter or dehydrator is used, the type of it is not specifically limited either, and those commonly used can be used, including, for example, pressure dehydrators such as filter presses, drum filters, belt presses and tube presses or vacuum drum filters such as Oliver filters or the like, which can be suitably used to give a calcium carbonate cake. Grinding means include ball mills, sand grinder mills, impact mills, high pressure homogenizers, low pressure homogenizers, Dyno mills, ultrasonic mills, Kanda grinders, attritors, millstone type mills, vibration mills, cutter mills, jet mills, breakers, beaters, single screw extruders, twin screw extruders, ultrasonic stirrers, juicers/mixers for home use, etc. Classification means include sieves such as meshes, outward or inward flow slotted or round-hole screens, vibrating screens, heavyweight contaminant cleaners, lightweight contaminant cleaners, reverse cleaners, screening testers and the like. Dispersion means include high speed dispersers, low speed kneaders and the like.

The complexes obtained by the present invention can be compounded into fillers or pigments as a suspension without being completely dehydrated, or can be dried into powders. The dryer used in the latter case is not specifically limited either, but air-flow dryers, band dryers, spray dryers and the like can be suitably used, for example.

The complexes obtained by the present invention can be modified by known methods. In one embodiment, for example, they can be hydrophobized on their surface to enhance the miscibility with resins or the like.

Molded Products of the Complexes

The complexes of the present invention can be used to prepare molded products (articles), as appropriate. For example, the complexes obtained by the present invention can be readily formed into sheets having a high ash content. Further, the resulting sheets can be laminated to form multilayer sheets. Paper machines (sheet-forming machines) used for preparing sheets include, for example, Fourdrinier machines, cylinder machines, gap formers, hybrid formers, multilayer paper machines, known sheet-forming machines combining the papermaking methods of these machines and the like. The linear pressure in the press section of the paper machines and the linear calendering pressure in a subsequent optional calendering process can be both selected within a range convenient for the runnability and the performance of the complex sheets. Further, the sheets thus formed may be impregnated or coated with starches, various polymers, pigments and mixtures thereof.

During sheet forming, wet and/or dry strength additives (paper strength additives) can be added. This allows the strength of the complex sheets to be improved. Strength additives include, for example, resins such as urea-formaldehyde resins, melamine-formaldehyde resins, polyamides, polyamines, epichlorohydrin resins, vegetable gums, latexes, polyethylene imines, glyoxal, gums, mannogalactan polyethylene imines, polyacrylamide resins, polyvinylamines, and polyvinyl alcohols; composite polymers or copolymers composed of two or more members selected from the resins listed above; starches and processed starches; carboxymethylcellulose, guar gum, urea resins and the like. The amount of the strength additives to be added is not specifically limited.

Further, high molecular weight polymers or inorganic materials can be added to promote the adhesion of fillers to fibers or to improve the retention of fillers or fibers. For example, coagulants can be added, including cationic polymers such as polyethylene imines and modified polyethylene imines containing a tertiary and/or quaternary ammonium group, polyalkylene imines, dicyandiamide polymers, polyamines, polyamine/epichlorohydrin polymers, polymers of dialkyldiallyl quaternary ammonium monomers, dialkylaminoalkyl acrylates, dialkylaminoalkyl methacrylates, dialkylaminoalkyl acrylamides and dialkylaminoalkyl methacrylamides with acrylamides, monoamine/epihalohydrin polymers, polyvinylamines and polymers containing a vinylamine moiety as well as mixtures thereof; cation-rich zwitterionic polymers containing an anionic group such as a carboxyl or sulfone group copolymerized in the molecules of the polymers listed above; mixtures of a cationic polymer and an anionic or zwitterionic polymer and the like. Further, retention aids such as cationic or anionic or zwitterionic polyacrylamide-based materials can be used. These may be applied as retention systems called dual polymers in combination with at least one or more cationic or anionic polymers or may be applied as multicomponent retention systems in combination with at least one or more anionic inorganic microparticles such as bentonite, colloidal silica, polysilicic acid, microgels of polysilicic acid or polysilicic acid salts and aluminum-modified products thereof or one or more organic microparticles having a particle size of 100 µm or less called micropolymers composed of crosslinked/polymerized acrylamides. Especially when the polyacrylamide-based materials used alone or in combination with other materials have a weight-average molecular weight of 2,000,000 Da or more, preferably 5,000,000 Da or more as determined by intrinsic viscosity measurement, good retention can be achieved, and when the acrylamide-based materials have a molecular weight of 10,000,000 Da or more and less than 30,000,000 Da, very high retention can be achieved. The polyacrylamide-based materials may be emulsions or solutions. Specific compositions of such materials are not specifically limited so far as they contain an acrylamide monomer unit as a structural unit therein, but include, for example, copolymers of a quaternary ammonium salt of an acrylate ester and an acrylamide, or ammonium salts obtained by copolymerizing an acrylamide and an acrylate ester and then quaternarizing the copolymer. The cationic charge density of the cationic polyacrylamide-based materials is not specifically limited. Other additives include freeness improvers, internal sizing agents, pH modifiers, antifoaming agents, pitch control agents, slime control agents, bulking agents, inorganic particles (the so-called fillers) such as calcium carbonate, kaolin, talc and silica and the like depending on the purposes. The amount of these additives to be used is not specifically limited.

Molding techniques other than sheet forming may also be used, and molded products having various shapes can be obtained by the so-called pulp molding process involving casting a raw material into a mold and then dewatering by suction and drying it or the process involving spreading a raw material over the surface of a molded product of a resin or metal or the like and drying it, and then releasing the dried material from the substrate or other processes. Further, the complexes can be molded like plastics by mixing them with resins, or can be molded like ceramics by calcining them with minerals such as silica or alumina. In the compounding/drying/molding steps shown above, only one complex can be used, or a mixture of two or more complexes can be used. Two or more complexes can be used as a premixture of them or can be mixed after they have been individually compounded, dried and molded.

Further, various organic materials such as polymers or various inorganic materials such as pigments may be added later to molded products of the complexes.

EXAMPLES

The following examples further illustrate the present invention, but the present invention is not limited to these examples. Unless otherwise specified, the concentrations, parts and the like as used herein are based on weight, and the numerical ranges are described to include their endpoints.

Experiment 1-1: Synthesis of Complexes (1) A Complex of Calcium Carbonate Particles and a Cellulose Fiber An aqueous suspension in an amount of 30 L containing calcium hydroxide (slaked lime $Ca(OH)_2$, 300 g) and a bleached softwood kraft pulp (NBKP, Canadian standard freeness CSF: 215 mL, 300 g) was provided. A 40-L closed system was charged with this aqueous suspension and carbonic acid gas was injected into the reaction vessel to synthesize a complex of calcium carbonate microparticles and a fiber by the carbonation process, thereby giving Sample A. The reaction temperature was about 25° C., the carbonic acid gas source was a commercially available liquefied gas, the injection flow rate of the carbonic acid gas was 12 L/min, and the reaction was stopped when the pH of the reaction solution reached about 7 (from the pH of about 12.8 before the reaction).

During the synthesis of the complex, cavitation bubbles were generated in the reaction vessel by injecting the reaction solution into the reaction vessel while circulating it, as shown in FIG. 1. Specifically, cavitation bubbles were generated by injecting the reaction solution through a nozzle (nozzle diameter: 1.5 mm) under high pressure at an injection rate of about 70 m/s, an inlet pressure (upstream pressure) of 7 MPa and an outlet pressure (downstream pressure) of 0.3 MPa.

The weight ratio of fiber:inorganic particles in the complex was 45:55. In this context, the weight ratio was calculated based on the ash content of the complex determined from the ratio between the weight of ash remaining after the complex was heated at 525° C. for about 2 hours and the original solids content (JIS P 8251: 2003).

(2) A Complex of Barium Sulfate Particles and a Cellulose Fiber

A 1% pulp slurry (LBKP/NBKP=8/2, 500 g) and barium hydroxide octahydrate (from Wako Pure Chemical Industries, 5.82 g) were mixed using a Three-One Motor agitator (1000 rpm), and then sulfuric acid (from Wako Pure Chemical Industries, 2.1 g) was added dropwise. After completion of the dropwise addition, stirring was continued for 30 minutes to give Sample 1. The mixed pulp used had an average fiber length of 1.21 mm as determined by a fiber tester (from Lorentzen & Wettre).

The resulting complex slurry (3 g on a solids basis) was filtered through a filter paper under suction, and then the residue was dried in an oven (105° C., 2 hours) and the ash content was determined to show that the weight ratio of fiber:inorganic particles in the complex was 56:44.

(3) A Complex of Barium Sulfate Particles and an Aramid Fiber (Reference Example)

A complex was synthesized in the same manner as described for Sample 1 (Experiment 2) except that a 0.8% slurry of an aramid fiber (Twaron RD-1094 from TEIJIN LIMITED, 625 g) was used as the fiber component to give Sample 2.

The resulting complex slurry (3 g on a solids basis) was filtered through a filter paper under suction, and then the residue was dried in an oven (105° C., 2 hours) and the ash content was determined to show that the weight ratio of fiber:inorganic particles in the complex was 55:45.

(4) A Complex of Composite Particles of Calcium and Aluminum and a Cellulose Fiber To 500 g of a 1% slurry of Sample A was added an aqueous solution (concentration 3%) of aluminum chloride hexahydrate (from Wako Pure Chemical Industries, 3.3 g) with stirring using a Three-One Motor agitator (1000 rpm). During then, sodium hydroxide (from Wako Pure Chemical Industries) was added as appropriate to keep the pH constant at 7. After completion of the addition of aluminum chloride hexahydrate, stirring was continued for 30 minutes to give Sample 3.

The resulting complex slurry (3 g on a solids basis) was filtered through a filter paper under suction, and then the residue was dried in an oven (105° C., 2 hours) and the ash content was determined to show that the weight ratio of fiber:inorganic particles in the complex was 52:48.

(5) A Complex of Aluminum Hydroxide Particles and a Cellulose Fiber

A 1% pulp slurry (LBKP/NBKP=8/2, 500 g) and an aqueous aluminum sulfate solution (11 g as $Al_2(SO)_4$) were mixed using a Three-One Motor agitator (1000 rpm), and then an aqueous solution (concentration 5%) of sodium hydroxide (from Wako Pure Chemical Industries, 15.4 g) was added dropwise. After completion of the dropwise addition, stirring was continued for 30 minutes to give Sample 5.

The resulting complex slurry (3 g on a solids basis) was filtered through a filter paper under suction, and then the residue was dried in an oven (105° C., 2 hours) and the ash content was determined to show that the weight ratio of fiber:inorganic particles in the complex was 58:42.

<Evaluation of the Complexes>

Each complex sample obtained was washed with ethanol, and then observed with an electron microscope. The results showed that the inorganic material covered the fiber surface and spontaneously adhered to it in each sample.

Figure 2:
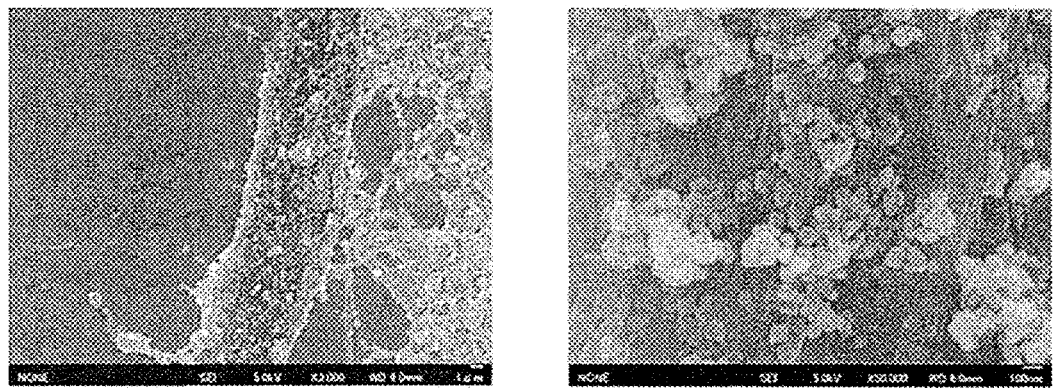
FIG. 2 shows electron micrographs of a complex of inorganic particles and a cellulose fiber (Sample A) (magnification: left 3000×, right 50000×).
Figure 3:
FIG. 3 shows electron micrographs of a complex of inorganic particles and a cellulose fiber (Sample 1) (magnification: left 500×, center 3000×, right 10000×).
Figure 4:
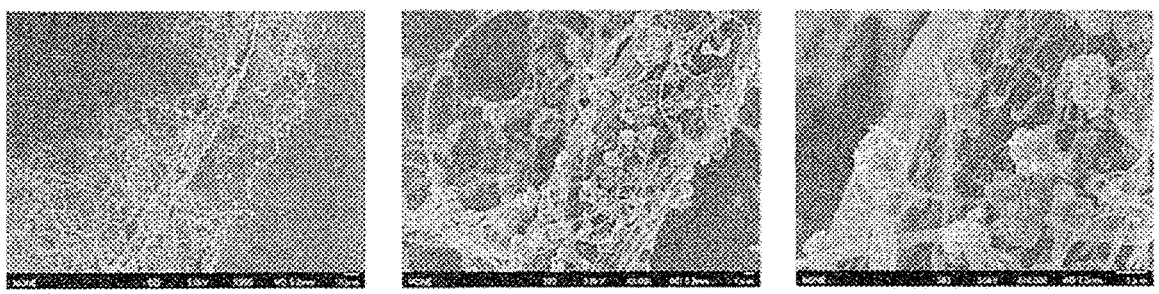
FIG. 4 shows electron micrographs of a complex of inorganic particles and a cellulose fiber (Sample 2) (magnification: left 500×, center 3000×, right 10000×).
Figure 5:
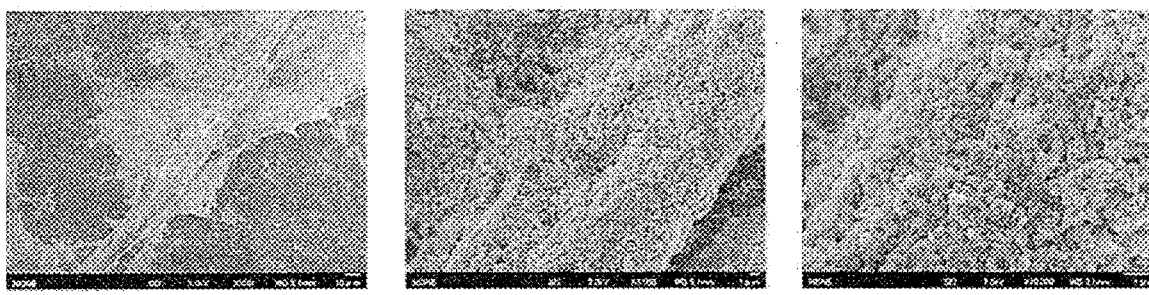
FIG. 5 shows electron micrographs of a complex of inorganic particles and a cellulose fiber (Sample 3) (magnification: left 500×, center 3000×, right 10000×).
Figure 6:
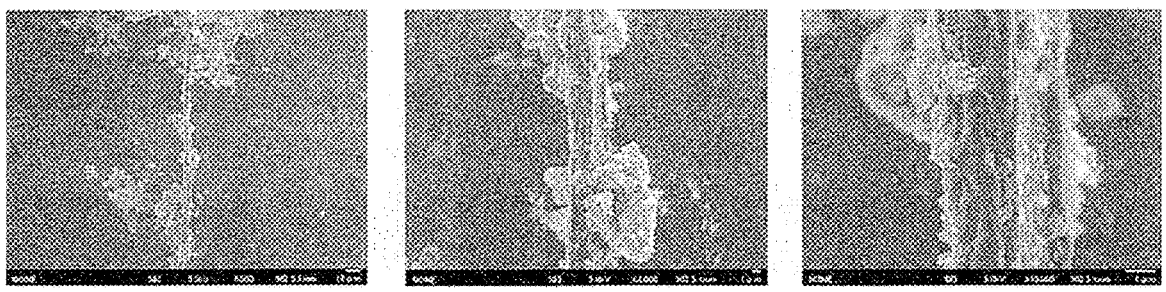
FIG. 6 shows electron micrographs of a complex of inorganic particles and a cellulose fiber (Sample 4) (magnification: left 500×, center 3000×, right 10000×).
Figure 7:
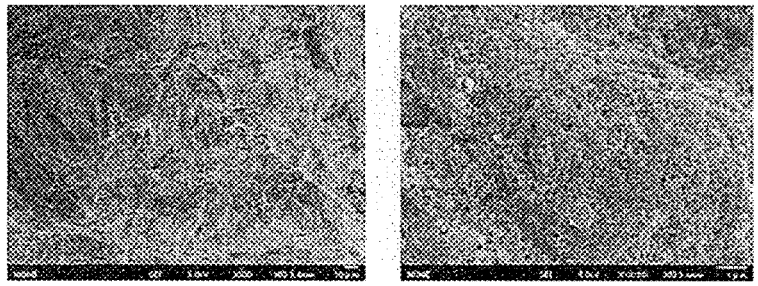
FIG. 7 shows electron micrographs of a sheet prepared from a complex (Sample A) (magnification: left 500×, right 10000×).
Figure 8:
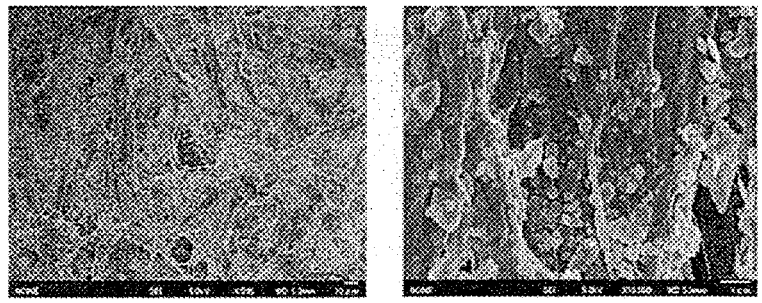
FIG. 8 shows electron micrographs of a sheet prepared from a complex (Sample 1) (magnification: left 500×, right 10000×).
Figure 9:
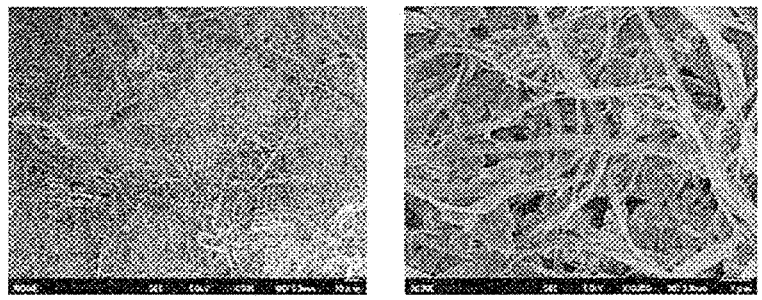
FIG. 9 shows electron micrographs of a sheet prepared from a complex (Sample 2) (magnification: left 500×, right 10000×).
Figure 10:
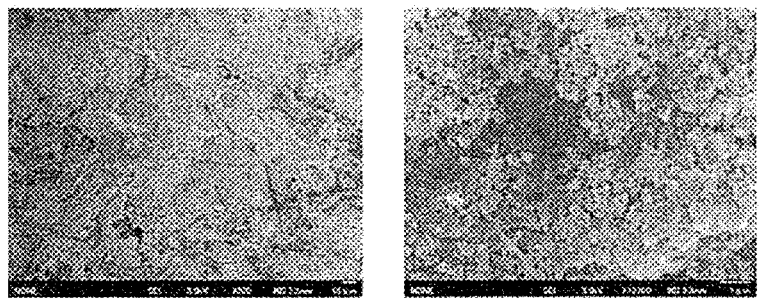
FIG. 10 shows electron micrographs of a sheet prepared from a complex (Sample 3) (magnification: left 500×, right 10000×).
Figure 11:
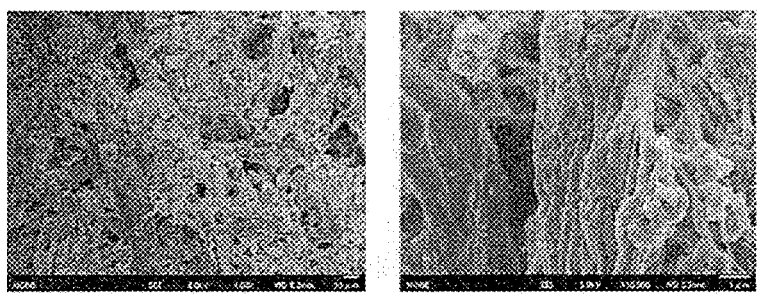
FIG. 11 shows electron micrographs of a sheet prepared from a complex (Sample 4) (magnification: left 500×, right 10000×).

Electron micrographs of the resulting complexes are shown in FIGS. 2 to 6. FIG. 2 shows electron micrographs of a complex of a softwood pulp fiber and calcium carbonate microparticles treated by cavitation (Sample A). As seen from FIG. 2, electron microscopic observation of the resulting complex (a complex of a calcium carbonate and a cellulose fiber, Sample A) showed that a complex had been formed in which a calcium carbonate having a primary particle size of 30 to 90 nm (average primary particle size: about 80 nm) covers the surface of the pulp fiber. In the complex, the calcium carbonate was observed to spontaneously adhere onto the pulp fiber. The average primary particle sizes of the inorganic particles in the complexes were about 0.5 μm in Sample 1, about 0.8 μm in Sample 2, about 0.01 μm (10 nm) in Sample 3, and about 1 μm in Sample 4.

Further, the coverage ratio on the fiber surface in the resulting complexes was determined. The coverage ratio was determined by binarizing the image taken during observation by electron microscopy into areas occupied by inorganic materials (white) and areas occupied by fibers (black) and calculating the proportion of the white areas, i.e., the areas occupied by inorganic materials to the whole image (area ratio). The coverage ratio was determined by using an image processing software (Image J, National Institutes of Health).

The coverage ratios were about 25% in Sample A, about 50% in Sample 1, about 40% in Sample 2, about 100% in Sample 3, and about 30% in Sample 4.

Experiment 1-2: Preparation and Evaluation of Complex Sheets

Each complex obtained in the experiments described above was filtered through a filter paper under suction, and then the residue was dispersed in tap water to prepare a slurry having a concentration of about 0.2%. This slurry was disintegrated in a standard disintegrator as defined by JIS P 8220-1: 2012 for 5 minutes, and then passed through a 150-mesh wire to prepare a handsheet having a basis weight of 60 g/m² according to JIS P 8222: 1998.

The resulting handsheet was analyzed by electron microscopic observation and ash content determination. As seen from the results shown in FIG. 7 to FIG. 11, electron microscopic observation of the surface of the handsheet demonstrated that the inorganic material firmly adhered on its own to the fiber surface.

Experiment 2-1: Synthesis of a Complex of Calcium Carbonate Microparticles and a Pulp Fiber An aqueous suspension in an amount of 100 L containing calcium hydroxide (slaked lime Ca(OH)$_2$, 1250 g) and a bleached hardwood kraft pulp (LBKP, Canadian standard freeness CSF: 460 mL, average fiber length: 0.8 mm, 1250 g) was provided. A 500-L cavitation system was charged with this aqueous suspension and carbonic acid gas was injected into the reaction vessel to synthesize a complex of calcium carbonate microparticles and a fiber by the carbonation process. The reaction temperature was about 25° C., the carbonic acid gas source was a commercially available liquefied gas, the injection flow rate of the carbonic acid gas was 12 L/min, and the reaction was stopped when the pH of the reaction solution reached about 7 (from the pH of about 12.8 before the reaction).

During the synthesis of the complex, cavitation bubbles were generated in the reaction vessel by injecting the reaction solution into the reaction vessel while circulating it, as shown in FIG. 1. Specifically, cavitation bubbles were generated by injecting the reaction solution through a nozzle (nozzle diameter: 1.5 mm) under high pressure at an injection rate of about 70 m/s, an inlet pressure (upstream pressure) of 7 MPa and an outlet pressure (downstream pressure) of 0.3 MPa.

Figure 12:
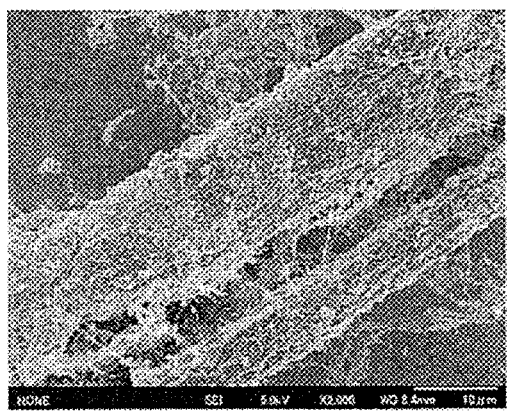
FIG. 12 shows an electron micrograph of the calcium carbonate/fiber complex (Sample A) obtained in Experiment 2-1 (magnification: 2000×).

Electron microscopic observation of the resulting product (Sample B) showed that a complex had been formed in which a calcium carbonate having a primary particle size of 60 to 90 nm covers the surface of the pulp fiber (FIG. 12). In the complex, the calcium carbonate was observed to spontaneously adhere onto the pulp fiber.

The weight ratio of fiber:inorganic particles in the complex was 44:56. This weight ratio was calculated based on the ash content of the complex determined from the ratio between the weight of ash remaining after the complex was heated at 525° C. for about 2 hours and the original solids content (JIS P 8251: 2003).

Figure 13:
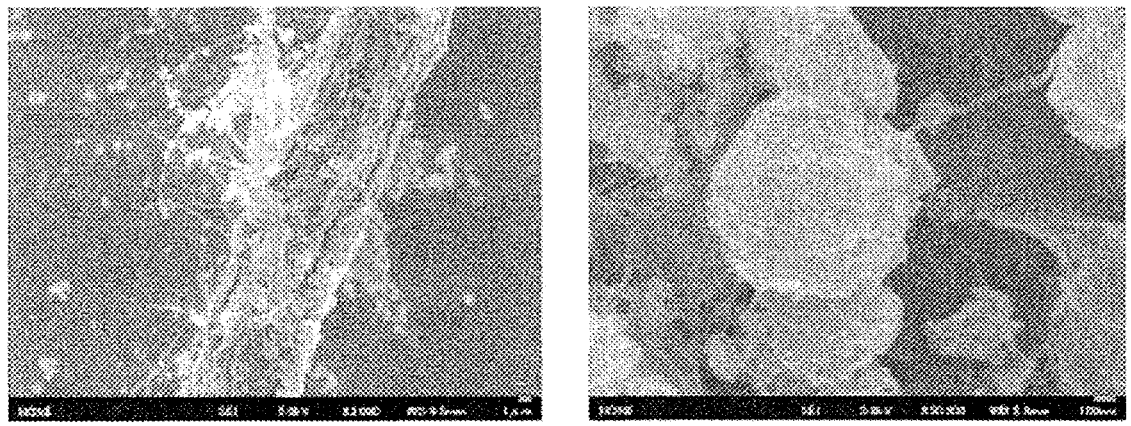
FIG. 13 shows electron micrographs of a calcium phosphate/fiber complex (Sample 1) synthesized in Experiment 2-2 (magnification: left 3000×, right 50000×).

Experiment 2-2: Synthesis of Complexes of a Calcium Phosphate and a Pulp Fiber (1) Sample 5 (FIG. 13): Sample B (595 mL, concentration 4.2%) was stirred with phosphoric acid (from Tosoh Corporation, concentration 10%, 57 g) to give a complex of a calcium phosphate and a pulp. The weight ratio of fiber:inorganic particles in the complex was 44:56, and the coverage ratio was about 40%.

Figure 14:
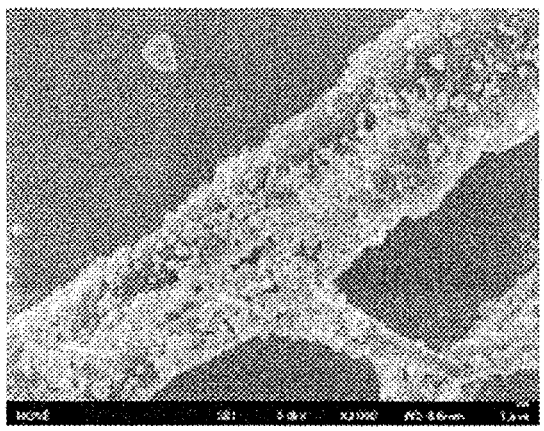
FIG. 14 shows electron micrographs of a calcium phosphate/fiber complex (Sample 2) synthesized in Experiment 2-2 (magnification: left 3000×, right 50000×).
Figure 14:
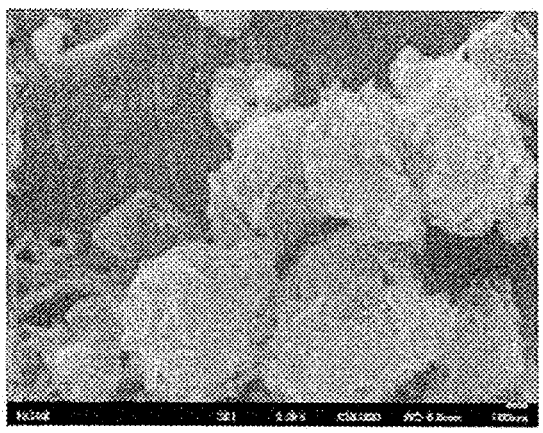

(2) Sample 6 (FIG. 14): Sample B (595 mL, concentration 4.2%) was stirred with titanium dioxide (SSP-25 from Sakai Chemical Industry Co., Ltd., 1.4 g) and phosphoric acid (from Tosoh Corporation, concentration 10%, 57 g) to give a titanium-bearing complex of a calcium phosphate and a pulp. The weight ratio of fiber:inorganic particles in the complex was 44:56, and the coverage ratio was about 50%.

Figure 15:
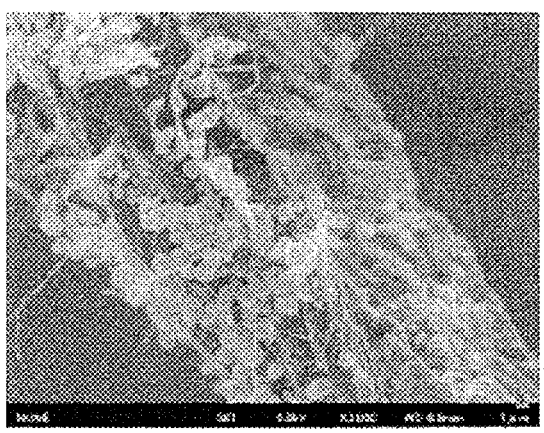
FIG. 15 shows electron micrographs of a calcium phosphate/fiber complex (Sample 3) synthesized in Experiment 2-2 (magnification: left 3000×, right 50000×).
Figure 15:
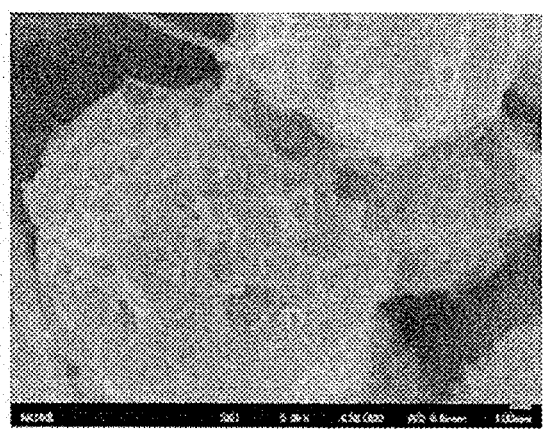

(3) Sample 7 (FIG. 15): A complex was synthesized in the same manner as described in (1) above except that the concentration of phosphoric acid was 60% and the amount of phosphoric acid added was 9.5 g. The weight ratio of fiber:inorganic particles in the complex was 42:58, and the coverage ratio was about 40%.

Figure 16:
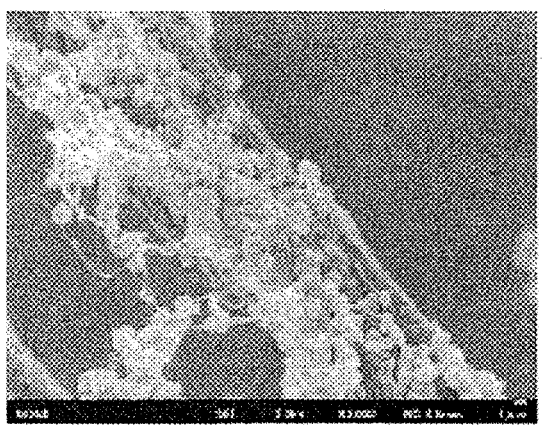
FIG. 16 shows electron micrographs of a calcium phosphate/fiber complex (Sample 4) synthesized in Experiment 2-2 (magnification: left 3000×, right 50000×).
Figure 16:
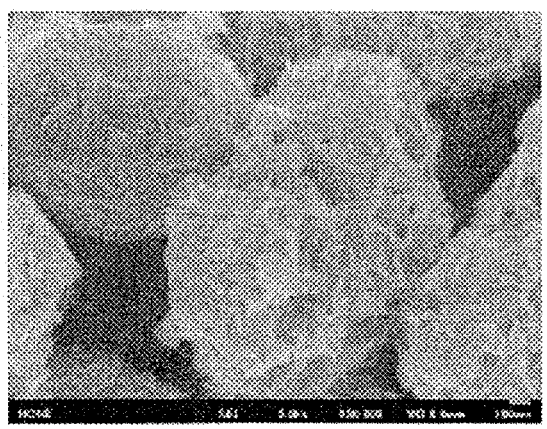

(4) Sample 8 (FIG. 16): A complex was synthesized in the same manner as described in (2) above except that the concentration of phosphoric acid was 60% and the amount of phosphoric acid added was 9.5 g. The weight ratio of fiber:inorganic particles in the complex was 42:58, and the coverage ratio was about 50%.

Figure 17:
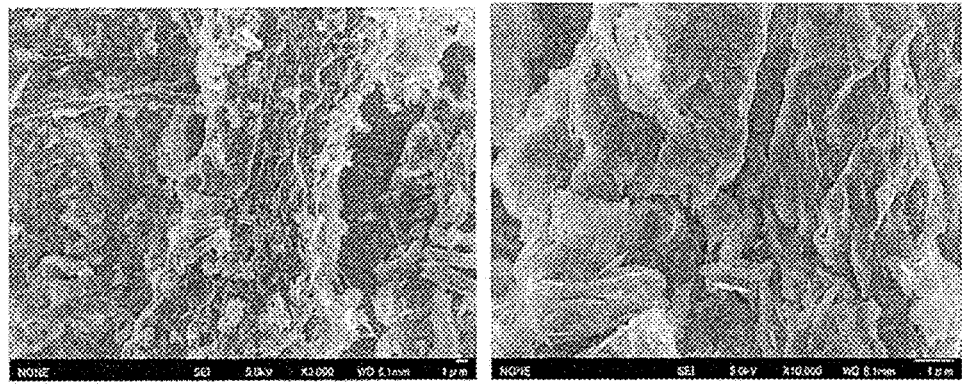
FIG. 17 shows electron micrographs of the complex of magnesium carbonate microparticles and a fiber (LBKP) synthesized in Experiment 3-1 (magnification: left 3000×, right 10000×).

Experiment 3: Synthesis of Complexes of Magnesium Carbonate Microparticles and a Fiber Experiment 3-1 (FIG. 17)

An aqueous suspension containing 140 g of magnesium hydroxide (from Wako Pure Chemical Industries, Ltd.) and 140 g of a bleached hardwood kraft pulp (LBKP, CSF: 370 ml, average fiber length: 0.75 mm) was provided. A 45-L cavitation system was charged with 14 L of this aqueous suspension and carbonic acid gas was injected into the reaction vessel while circulating the reaction solution to synthesize a complex of magnesium carbonate microparticles and a fiber by the carbonation process. The reaction temperature was about 36° C., the carbonic acid gas source was a commercially available liquefied gas, and the injection flow rate of the carbonic acid gas was 4 L/min. When the pH of the reaction solution reached about 7.8 (from the pH of about 9.5 before the reaction), the injection of $CO_2$ was stopped, after which the generation of cavitation and the circulation of the slurry within the system were continued for 30 minutes to give Sample 3-1.

During the synthesis of the complex, cavitation bubbles were generated in the reaction vessel by injecting the reaction solution into the reaction vessel while circulating it, as shown in FIG. 1. Specifically, cavitation bubbles were generated by injecting the reaction solution through a nozzle (nozzle diameter: 1.5 mm) under high pressure at an injection rate of about 70 m/s, an inlet pressure (upstream pressure) of 7 MPa and an outlet pressure (downstream pressure) of 0.3 MPa.

Figure 18:
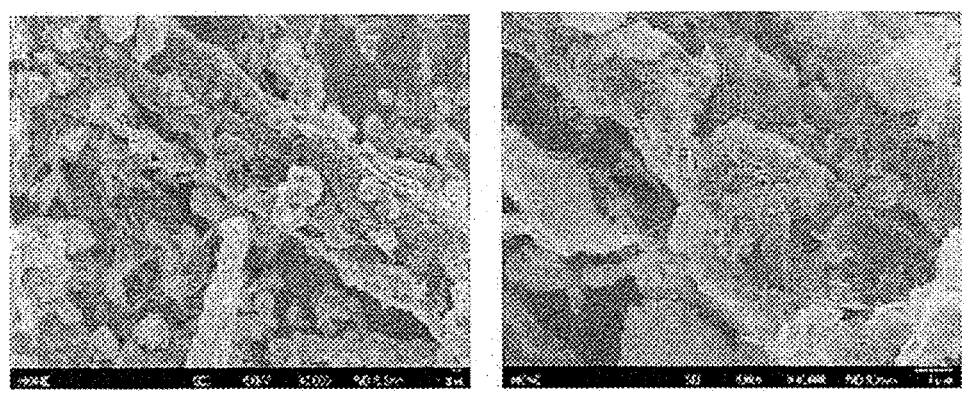
FIG. 18 shows electron micrographs of the complex of calcium carbonate microparticles and a fiber (LBKP) synthesized in Experiment 3-2 (magnification: left 3000×, right 10000×).

Experiment 3-2 (FIG. 18)

A complex of magnesium carbonate and a fiber was synthesized in the same manner as in Experiment 3-1 except that immediately after the injection of carbonic acid gas was stopped, the reaction solution was transferred into a hot bath at 70° C. and stirred with a stirrer for 30 minutes without cavitation in Experiment 3-1 (Sample 3-2).

Figure 19:
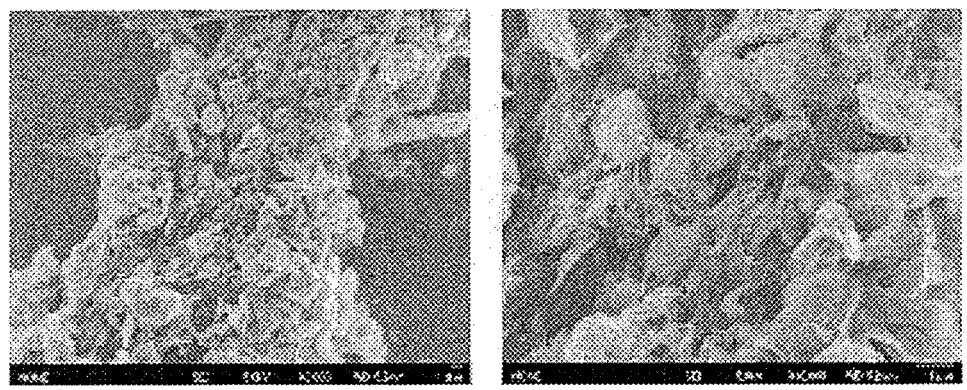
FIG. 19 shows electron micrographs of the complex of calcium carbonate microparticles and a fiber (LBKP) synthesized in Experiment 3-3 (magnification: left 3000×, right 10000×).

Experiment 3-3 (FIG. 19)

This experiment was performed in the same manner as in Experiment 1-2 except that a 3-L stainless steel vessel was used as a reaction vessel and charged with 20 g of the pulp, carbonic acid gas was injected at an injection rate of 0.57 L/min, and the carbonation reaction was performed in a water bath at 35° C. with stirring using a Three-One Motor agitator (800 rpm) (Sample 3-3).

Figure 20:
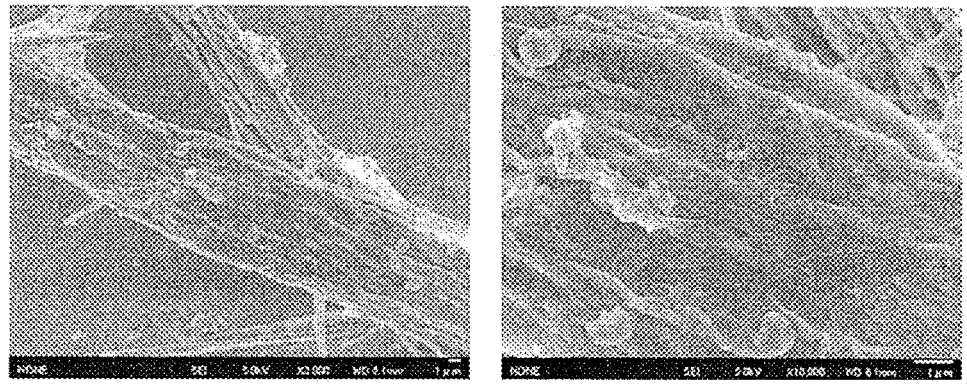
FIG. 20 shows electron micrographs of the complex of magnesium carbonate microparticles and a fiber (LBKP) synthesized in Experiment 3-4 (magnification: left 3000×, right 10000×).

Experiment 3-4 (FIG. 20)

A complex of magnesium carbonate and a fiber was synthesized in the same manner as in Experiment 3-1 except that the inlet pressure was 1.8 MPa (Sample 3-4).

Figure 21:
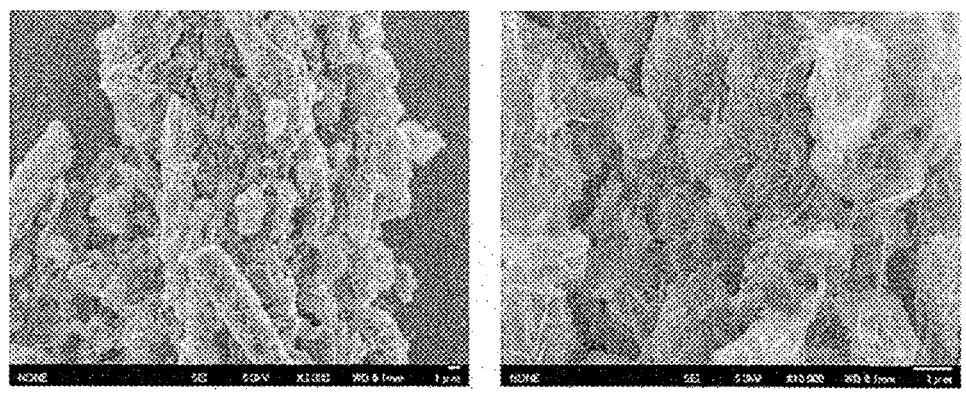
FIG. 21 shows electron micrographs of the complex of calcium carbonate microparticles and a fiber (LBKP) synthesized in Experiment 3-5 (magnification: left 3000×, right 10000×).

Experiment 3-5 (FIG. 21)

Magnesium carbonate was synthesized in the same manner as in Experiment 3-2 except that the inlet pressure was 1.8 MPa (Sample 3-5).

Figure 22:
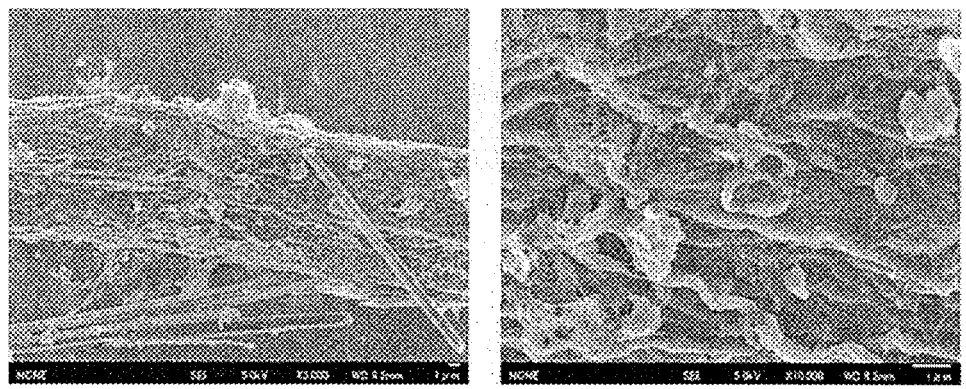
FIG. 22 shows electron micrographs of the complex of calcium carbonate microparticles and a fiber (LBKP) synthesized in Experiment 3-6 (magnification: left 3000×, right 10000×).

Experiment 3-6 (FIG. 22)

This experiment was performed in the same manner as in Experiment 3-4 except that sodium hydroxide (150 mL of a 0.4 mol product) was added into the reaction solution instead of continuing cavitation for 30 minutes after the injection of carbonic acid gas was stopped (Sample 3-6).

<Evaluation of the Complexes>

Electron micrographs of the complexes obtained are shown in FIGS. 17 to 22. As seen from the figures, many magnesium carbonate particles were deposited on the fiber surface in all cases. The primary particles of magnesium carbonate were mostly flaky, and had a primary particle size (major axis diameter) in the order of 0.1 to 3 μm.

The reaction solutions containing the complexes were filtered through a filter paper under suction and observed, showing that the complexes of a fiber and magnesium carbonate microparticles stably existed and that the magnesium carbonate microparticles did not drop from the fiber.

Further, the weight ratio of fiber:inorganic particles in these complexes was determined to be 45:55, which coincided roughly with the theoretical value (47:53) calculated from the initial ratio of the raw materials (pulp and magnesium hydroxide). This weight ratio was calculated based on the ash content of each complex determined from the ratio between the weight of ash remaining after the complex was heated at 525° C. for about 2 hours and the original solids content (JIS P 8251: 2003). The coverage ratios were about 100% in Sample 9-1, about 100% in Sample 9-2, about 100% in Sample 9-3, about 100% in Sample 9-4, about 100% in Sample 9-5, and about 100% in Sample 9-6.

Figure 23:
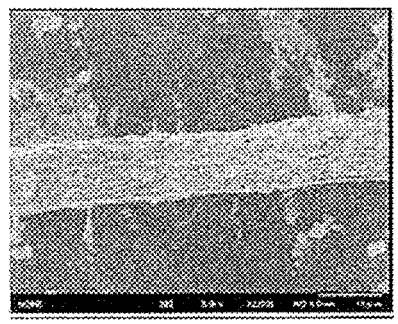
FIG. 23 shows a photograph of Experiment 4-1 (Sample C) (magnification: 2000×).

Experiment 4: Synthesis of Complexes of Silica and/or Alumina Microparticles and a Fiber Experiment 4-1: Sample C, FIG. 23

A complex was synthesized in the same manner as in Experiment 1-1 except that a bleached hardwood kraft pulp (LBKP, CSF: 460 mL, average fiber length: 0.76 mm) was used as the fiber. The results of electron microscopic observation showed that a calcium carbonate having a primary particle size of 40 to 100 nm spontaneously adhered to the fiber surface. The weight ratio of fiber:inorganic particles in the complex was 17:83, and the coverage ratio was 100%.

Figure 24:
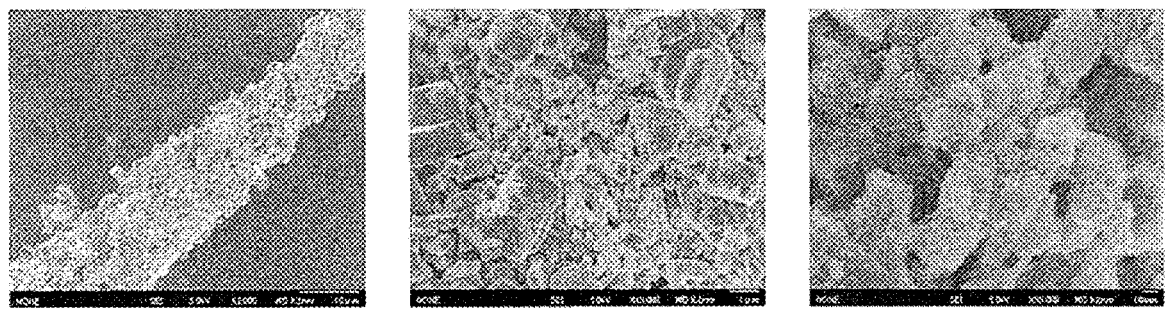
FIG. 24 shows photographs of Experiment 4-2 (Sample 4-1) (magnification: from left 2000×, 10000×, 50000×).

Experiment 4-2: Sample 4-1, FIG. 24

A mixture of 280 g of calcium hydroxide and 70 g of a bleached hardwood kraft pulp (LBKP, Canadian standard freeness CSF: 460 mL, average fiber length: 0.8 mm) was diluted to 14 L with tap water. After 400 g of sodium silicate (about 30% as $SiO_2$) was added, the mixture was thrown into the reaction vessel. The subsequent procedures and reaction conditions were the same as those of Experiment 1 except that the reaction was stopped when the pH reached about 6.7.

The results of electron microscopic observation showed that particles having a primary particle size in the order of 20 to 50 nm supposed to be silica were deposited on the surface of calcium carbonate. Further, the weight ratio of fiber:inorganic particles in the complex was 27:73, and the coverage ratio was 100%.

Figure 25:
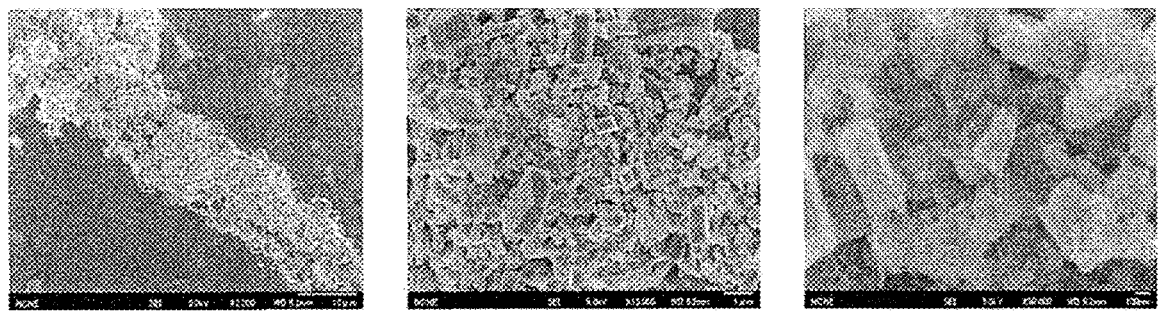
FIG. 25 shows photographs of Experiment 4-3 (Sample 4-2) (magnification: from left 2000×, 10000×, 50000×).

Experiment 4-3: Sample 4-2, FIG. 25

After the pH reached about 6.7 in Experiment 4-2, an aqueous aluminum sulfate solution (0.8% as alumina) was further added to continue the reaction until the pH reached 6.2.

The results of electron microscopic observation showed that particles having a primary particle size in the order of 20 to 50 nm supposed to be silica were deposited on the surface of calcium carbonate. Further, the weight ratio of fiber:inorganic particles in the complex was 30:70, and the coverage ratio was 30%.

Figure 26:
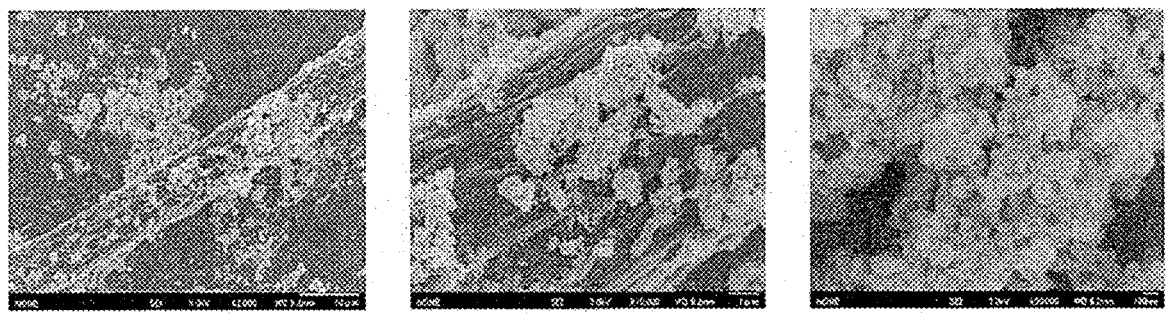
FIG. 26 shows photographs of Experiment 4-4 (Sample 4-3) (magnification: from left 2000×, 10000×, 50000×).

Experiment 4-4: Sample 4-3, FIG. 26

To 1 kg of a slurry (concentration 2.9%) of the complex of Sample C was added 29 g of sodium silicate (about 30% as $SiO_2$), and the mixture was stirred using a laboratory mixer, and 41 g of an aqueous sulfuric acid solution (10%) was added to synthesize a complex.

The results of electron microscopic observation showed that calcium carbonate having a primary particle size of about 80 nm as well as silica having a similar size were present on the fiber (LBKP). Analysis of the abundance ratio between silica ($SiO_2$) and calcium carbonate ($CaCO_3$) by X-ray fluorescence showed that both silica and calcium carbonate were present (Table 2). Further, the weight ratio of fiber:inorganic particles in the complex was 30:70, and the coverage ratio was 15%.

TABLE 1

X-ray fluorescence analysis

| Sample C6 | | Sample C8 | |
|---|---|---|---|
| $SiO_2$ | $CaCO_3$ | $SiO_2$ | $CaCO_3$ |
| 16.8 | 83.2 | 16.3 | 83.7 |

Experiment 5: Synthesis of Complexes of Calcium Carbonate Microparticles and a Fiber <Synthesis of Calcium Carbonate/Fiber Complexes>

An aqueous suspension containing calcium hydroxide (slaked lime Ca $(OH)_2$ from Wako Pure Chemical Industries, Ltd., 2% by weight) and a fiber (0.5%) was provided. A 45-L cavitation system was charged with 9.5 L of this aqueous suspension and carbonic acid gas was injected into the reaction vessel to synthesize a complex of calcium carbonate microparticles and the fiber by the carbonation process. The reaction temperature was about 25° C., the carbonic acid gas source was a commercially available liquefied gas, the injection flow rate of the carbonic acid gas was 12 L/min, and the reaction was stopped when the pH of the reaction solution reached about 7 (from the pH of about 12.8 before the reaction).

During the synthesis of the complex, cavitation bubbles were generated in the reaction vessel by injecting the reaction solution into the reaction vessel while circulating it, as shown in FIG. 1. Specifically, cavitation bubbles were generated by injecting the reaction solution through a nozzle (nozzle diameter: 1.5 mm) under high pressure at an injection rate of about 70 m/s, an inlet pressure (upstream pressure) of 7 MPa and an outlet pressure (downstream pressure) of 0.3 MPa.

In this experiment, the following four types of fibers were used to form complexes with calcium carbonate microparticles. Details of each fiber are shown below.

(1) A cellulose nanofiber (TEMPO-oxidized pulp);
(2) A thermomechanical pulp (TMP);
(3) A hemp pulp fiber having a microfibrillated surface.

Figure 27:
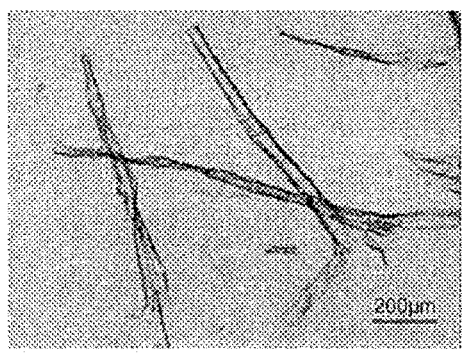
FIG. 27 shows an electron micrograph of the cellulose nanofiber used in Experiment 5 (magnification: 200×).

(A cellulose nanofiber) An NBKP oxidized with an N-oxyl compound was beaten with a Niagara beater for about 15 minutes until the CSF reached less than 100 mL to give a cellulose nanofiber. The resulting fiber had an average fiber length of 0.84 mm, an average fiber width of 35.0 µm, a (length-weighted) fines content of 12.3%, and a curl index of 9.2% (an electron micrograph shown in FIG. 27).

(A thermomechanical pulp) A thermomechanical pulp (TMP) beaten until the CSF reached about 400 mL.

(A hemp pulp fiber having a microfibrillated surface) A hemp pulp was treated by cavitation until the CSF decreased to less than 100 mL to give a hemp pulp having a microfibrillated surface.

<Evaluation of the Complexes>

Figure 28:
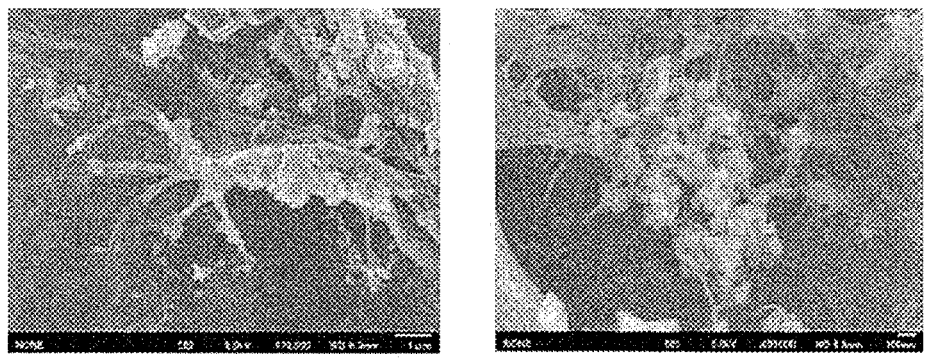
FIG. 28 shows electron micrographs of a complex of calcium carbonate microparticles and a fiber (cellulose nanofiber: CNF) synthesized in Experiment 5 (magnification: left 10000×, right 50000×).
Figure 29:
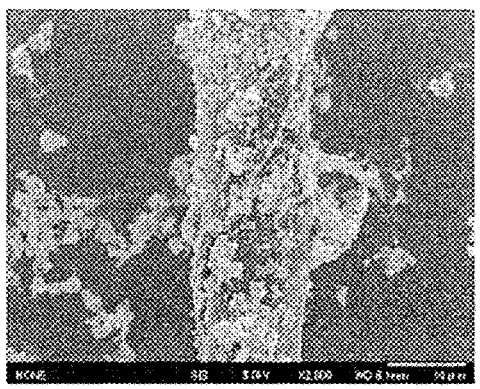
FIG. 29 shows an electron micrograph of a complex of calcium carbonate microparticles and a fiber (TMP) synthesized in Experiment 5 (magnification: 2000×).
Figure 30:
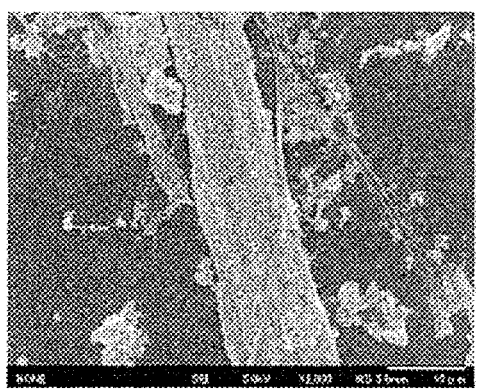
FIG. 30 shows an electron micrograph of a complex of calcium carbonate microparticles and a fiber (a CV-treated hemp pulp) synthesized in Experiment 5 (magnification: 2000×).
Figure 31:
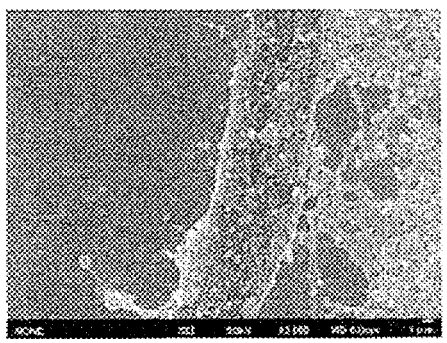
FIG. 31 shows electron micrographs of a complex of calcium carbonate and a pulp fiber (Sample 6-1) synthesized in Experiment 6 (magnification: left 3000×, right 50000×).
Figure 31:
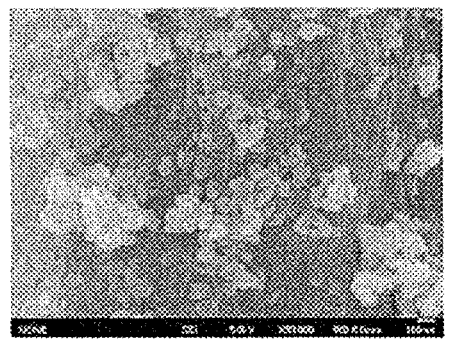
Figure 32:
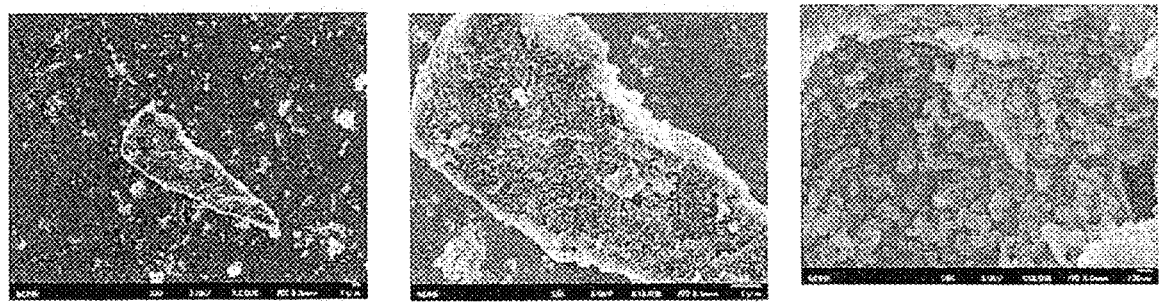
FIG. 32 shows electron micrographs of a complex of calcium carbonate and a powdered cellulose (Sample 6-2) synthesized in Experiment 6 (magnification: left 3000×, center 10000×, right 50000×).
Figure 33:
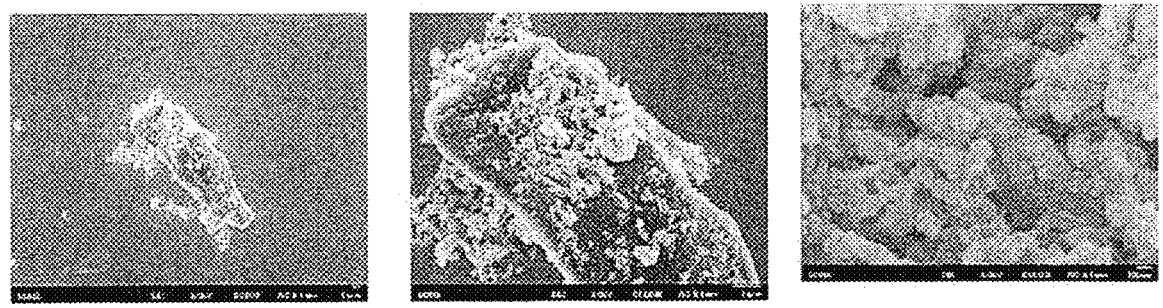
FIG. 33 shows electron micrographs of a complex of calcium carbonate and a powdered cellulose (Sample 6-3) synthesized in Experiment 6 (magnification: left 3000×, center 10000×, right 50000×).
Figure 34:
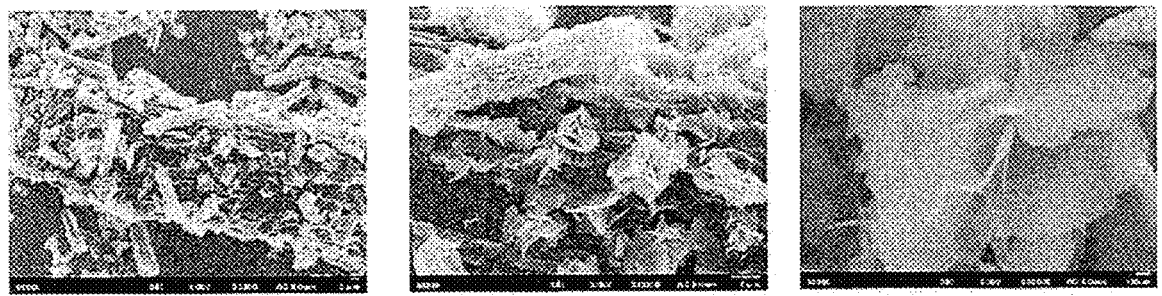
FIG. 34 shows electron micrographs of a complex of magnesium hydroxide and a powdered cellulose (Sample 6-4) synthesized in Experiment 6 (magnification: left 3000×, center 10000×, right 50000×).
Figure 35:
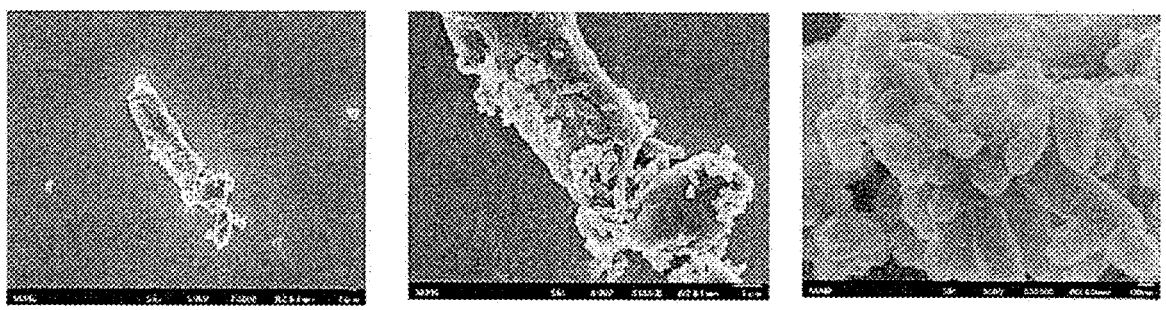
FIG. 35 shows electron micrographs of a complex of calcium carbonate and a powdered cellulose fiber (Sample 6-5) synthesized in Experiment 6 (magnification: left 3000×, center 10000×, right 50000×).
Figure 36:
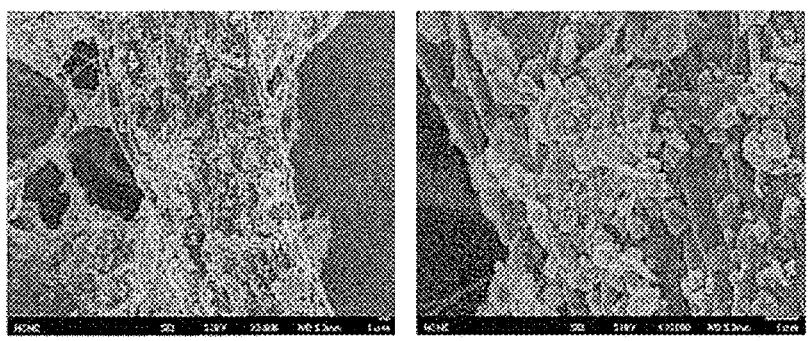
FIG. 36 shows electron micrographs of a complex of barium sulfate and a pulp fiber (Sample 7-1) synthesized in Experiment 7-1 (magnification: left 3000×, right 10000×).
Figure 37:
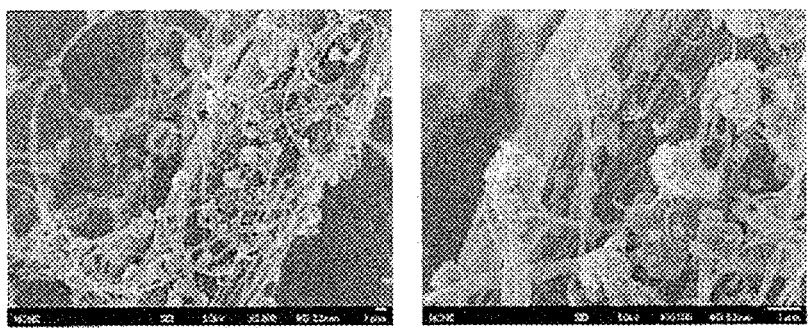
FIG. 37 shows electron micrographs of a complex of barium sulfate and an aramid fiber (Sample 7-2) synthesized in Experiment 7-1 (magnification: left 3000×, right 10000×).
Figure 38:
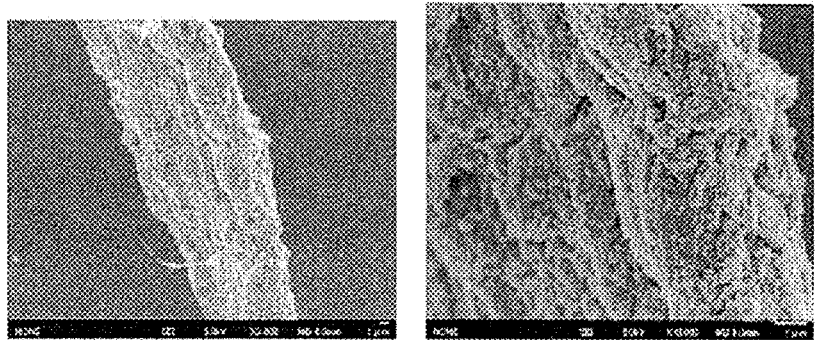
FIG. 38 shows electron micrographs of a complex of barium sulfate and a pulp fiber (Sample 7-3) synthesized in Experiment 7-1 (magnification: left 3000×, right 10000×).
Figure 39:
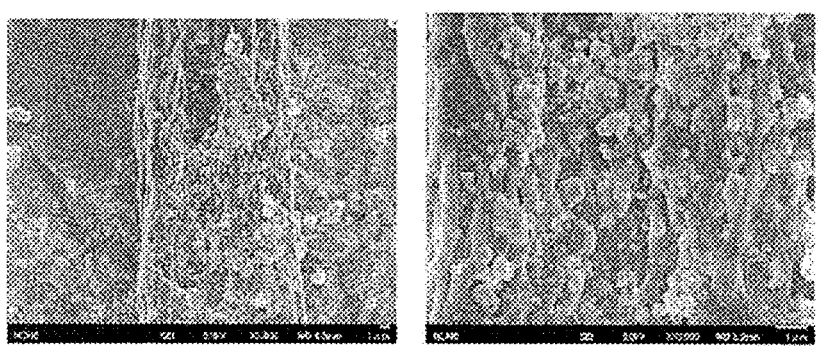
FIG. 39 shows electron micrographs of a complex of barium sulfate and a pulp fiber (Sample 7-4) synthesized in Experiment 7-1 (magnification: left 3000×, right 10000×).
Figure 40:
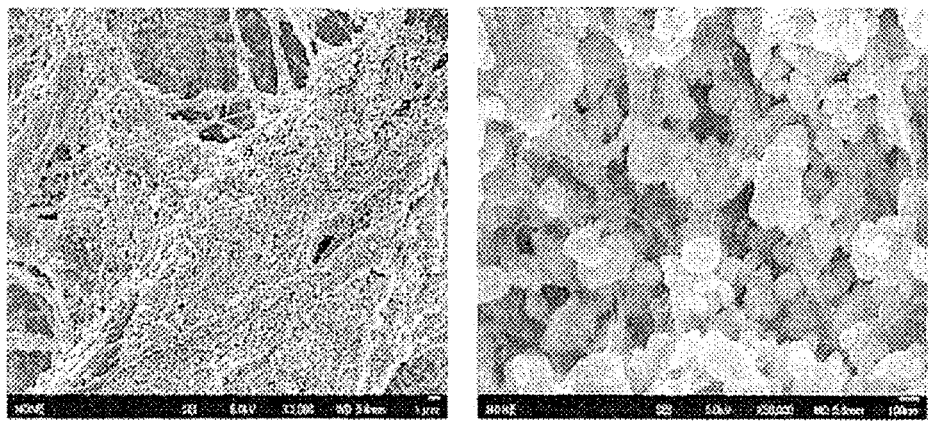
FIG. 40 shows electron micrographs of a complex of barium sulfate and a pulp fiber (Sample 7-5) synthesized in Experiment 7-1 (magnification: left 3000×, right 10000×).

Electron micrographs of the complexes obtained are shown in FIGS. 28 to 30. FIG. 28 shows electron micrographs of a complex of the TEMPO-oxidized pulp and calcium carbonate microparticles. As seen from FIG. 28, many calcium carbonate microparticles were also deposited on the fiber surface in this complex (coverage ratio: 40%), and the calcium carbonate microparticles had a primary particle size in the order of 40 to 100 nm (average in the order of 80 nm).

When a TMP was used (FIG. 29, coverage ratio: 80%) and when a hemp pulp was used (FIG. 30, coverage ratio: 100%), a calcium carbonate having a primary particle size of 40 to 80 nm was also observed to cover the fiber surface and spontaneously adhere to it.

The reaction solutions containing the complexes were filtered through a filter paper under suction and observed to show that the complexes of a fiber and calcium carbonate microparticles stably existed and that the calcium carbonate microparticles did not drop from the fiber.

Further, the ash contents of these complexes were determined to show that the weight ratio of fiber:inorganic particles in the complexes was in the order of 18:82, which coincided with the theoretical value (18:82) calculated from the initial ratio of the raw materials (pulp and calcium hydroxide). In this context, the weight ratio of each complex was calculated based on the ash content of the complex determined from the ratio between the weight of ash remaining after the complex was heated at 525° C. for about 2 hours and the original solids content (JIS P 8251: 2003).

Experiment 6: Synthesis of Complexes

<Synthesis of Complexes>

(1) A Complex of Calcium Carbonate Particles and a Pulp Fiber (Sample 6-1)

An aqueous suspension in an amount of 30 L containing 300 g of calcium hydroxide (Ca(OH), slaked lime) and 300 g of a bleached softwood kraft pulp (NBKP, Canadian standard freeness CSF: 215 mL) was provided. A 40-L closed system was charged with this aqueous suspension and cavitation was generated by injecting carbonic acid gas into the reaction vessel to synthesize a complex of calcium carbonate microparticles and the pulp fiber by the carbonation process, thereby giving Sample 6-1. The reaction temperature was about 25° C., the carbonic acid gas source was a commercially available liquefied gas, the injection flow rate of the carbonic acid gas was 12 L/min, and the reaction was stopped when the pH of the reaction solution reached about 7 (from the pH of about 12.8 before the reaction).

During the synthesis of the complex, cavitation bubbles were generated in the reaction vessel by injecting the reaction solution into the reaction vessel while circulating it, as shown in FIG. 1. Specifically, cavitation bubbles were generated by injecting the reaction solution through a nozzle (nozzle diameter: 1.5 mm) under high pressure at an injection rate of about 70 m/s, an inlet pressure (upstream pressure) of 7 MPa and an outlet pressure (downstream pressure) of 0.3 MPa.

The weight ratio of fiber:inorganic particles in the resulting complex was 45:55. In this context, the weight ratio was calculated based on the ash content of the complex determined from the ratio between the weight of ash remaining after the complex was heated at 525° C. for about 2 hours and the original solids content (JIS P 8251: 2003).

(2) A Complex of Calcium Carbonate Particles and a Powdered Cellulose (Sample 6-2)

A complex was prepared in the same manner as described in (1) except that the bleached softwood kraft pulp was replaced by a powdered cellulose (KC FLOCK W-06MG from Nippon Paper Industries Co., Ltd.). The weight ratio of fiber:inorganic particles in the resulting complex (Sample 6-2) was 43:57.

(3) A Complex of Calcium Carbonate Particles and a Powdered Cellulose (Sample 6-3)

A complex was prepared in the same manner as described in (1) except that the bleached softwood kraft pulp was replaced by a powdered cellulose (KC FLOCK, W-400G from Nippon Paper Industries Co., Ltd.). The weight ratio of fiber:inorganic particles in the resulting complex (Sample 6-3) was 43:57.

(4) A Complex of Magnesium Carbonate Particles and a Powdered Cellulose (Sample 6-4)

An aqueous suspension containing 300 g of magnesium hydroxide (from Wako Pure Chemical Industries) and 300 g of a powdered cellulose (KC FLOCK, W-400Y from Nippon Paper Industries Co., Ltd.) was provided. A 40-L closed system was charged with this aqueous suspension and cavitation was generated by injecting carbonic acid gas into the reaction vessel to synthesize a complex of magnesium carbonate microparticles and the powdered cellulose. The reaction temperature was about 25° C., the carbonic acid gas source was a commercially available liquefied gas, the injection flow rate of the carbonic acid gas was 12 L/min, and the reaction was stopped when the pH of the reaction solution reached about 8 (from the pH of about 9.5 before the reaction)

During the synthesis of the complex, cavitation bubbles were generated in the reaction vessel by injecting the reaction solution into the reaction vessel while circulating it, as shown in FIG. 1. Specifically, cavitation bubbles were generated by injecting the reaction solution through a nozzle (nozzle diameter: 1.5 mm) under high pressure at an injection rate of about 70 m/s, an inlet pressure (upstream pressure) of 7 MPa and an outlet pressure (downstream pressure) of 0.3 MPa. The weight ratio of fiber:inorganic particles in the resulting complex (Sample 6-4) was 45:55.

(5) A Complex of Calcium Carbonate Particles and a Powdered Cellulose (Sample 6-5)

This complex was synthesized in the same manner as described for Sample 6-1 except that the bleached softwood kraft pulp was replaced by a powdered cellulose (KC FLOCK, W-06MG from Nippon Paper Industries Co., Ltd.) and the feed amount of calcium hydroxide was 150 g. After completion of the reaction, 150 g of calcium hydroxide was further added to the slurry, and the reaction was further continued by injecting carbonic acid gas again under the same conditions to give a complex. The weight ratio of fiber:inorganic particles in the resulting complex (Sample 6-5) was 44:56.

(6) Sample 6-6

This complex was prepared in the same manner as described in (1) except that the bleached softwood kraft pulp was replaced by a powdered cellulose (KC FLOCK, W-100GK from Nippon Paper Industries Co., Ltd.) and 30 L of an aqueous suspension containing 84 g of calcium hydroxide (slaked lime: Ca(OH)) and 450 g of the powdered cellulose was used. The weight ratio of fiber:inorganic particles in the resulting complex (Sample 6-6) was 85:15.

(7) Sample 6-7

This complex was prepared in the same manner as described for Sample 6-6 except that 30 L of an aqueous suspension containing 225 g of calcium hydroxide (slaked lime Ca(OH)) and 450 g of the powdered cellulose was used. The weight ratio of fiber:inorganic particles in the resulting complex (Sample 6-7) was 61:39.

<Evaluation of the Complexes>

Each sample obtained was washed with ethanol, and then observed with an electron microscope. As shown in FIGS. 31 to 35, the inorganic material covered the fiber surface and spontaneously adhered to it in each sample. The primary particle sizes of calcium carbonate were in the order of 20 to 90 nm. in Sample 6-1 to Sample 6-3, and 200 to 500 nm in Sample 6-5. The primary particle size of magnesium carbonate in Sample 6-4 was about 0.5 to 1 μm in major axis diameter.

Further, a powdered cellulose and Sample 6-4, 6-6 or 6-7 were filled into a stainless steel pipe having a diameter of 38 mm and a length of 25 mm and compressed into a pellet (bone dry weight 4 g) at a pressure of 5 kg/cm$^2$ for 5 minutes, and the brightness and hue of the pellet before testing were determined. Then, the resulting pellet was heated in an electric oven at 200° C. for 10 minutes, and the brightness and hue after testing were determined to evaluate thermal discoloration. The results are shown in the table below.

The pellets formed of the complexes of calcium carbonate and a powdered cellulose (Samples 6-6 and 6-7) and the pellet formed of the complex of magnesium carbonate and a powdered cellulose (Sample 6-4) showed smaller changes in brightness and hue as compared with the pellet formed of a powdered cellulose alone. Further, the complex containing a higher amount of calcium carbonate showed smaller changes in brightness and hue, and the complex containing magnesium carbonate showed smaller changes in color than those containing calcium carbonate. These results demonstrated that complexes of calcium carbonate or magnesium carbonate and a powdered cellulose have a discoloration inhibitory effect.

TABLE 2

|  |  | Powdered cellulose |  | Sample 6 |  | Sample 7 |  | Sample 4 |  |
|---|---|---|---|---|---|---|---|---|---|
| Inorganic particles |  | — |  | Calcium carbonate |  | Calcium carbonate |  | Magnesium carbonate |  |
| Weight ratio of fiber:inorganic particles |  | — |  | 85:15 |  | 61:39 |  | 45:55 |  |
|  |  | Before testing | After testing | Before testing | After testing | Before testing | After testing | Before testing | After testing |
| Brightness |  | 91.9 | 59.4 | 90.5 | 71.2 | 89.6 | 70.8 | 92.3 | 87.2 |
| Hue | L* | 98.0 | 89.6 | 97.6 | 93.3 | 97.0 | 92.7 | 97.7 | 97.1 |
|  | a* | −0.6 | 0.1 | −0.5 | −0.4 | −0.3 | −0.1 | −0.3 | −0.8 |
|  | b* | 2.2 | 14.5 | 2.3 | 10.3 | 2.2 | 9.6 | 1.4 | 4.1 |

TABLE 2-continued

| Changes in brightness | | 32.5 | 19.3 | 18.9 | 5.1 |
|---|---|---|---|---|---|
| Changes in hue | ΔL* | 8.3 | 4.3 | 4.3 | 0.6 |
| | Δa* | −0.7 | 0.0 | −0.2 | 0.5 |
| | Δb* | −12.3 | −8.1 | −7.4 | −2.7 |
| | ΔE | 14.9 | 9.1 | 8.5 | 2.8 |

Experiment 7-1: Synthesis of Complexes of Barium Sulfate and a Fiber

<Synthesis of Complexes>

(1) Sample 1

A 1% pulp slurry (LBKP/NBKP=8/2, Canadian standard freeness CSF=about 80 mL, 500 g) and barium hydroxide octahydrate (from Wako Pure Chemical Industries, 5.82 g) were mixed with stirring using a Three-One Motor agitator (1000 rpm), and then sulfuric acid (from Wako Pure Chemical Industries, 88 g of a 2% aqueous solution) was added dropwise at a rate of 8 g/min using a peristaltic pump. After completion of the dropwise addition, stirring was continued for 30 minutes to give Sample 1. The pulp in the pulp slurry used had an average fiber length of 1.21 mm as determined by a fiber tester (from Lorentzen & Wettre).

(2) Sample 2

Sample 2 was synthesized in the same manner as described for Sample 1 except that a 0.8% slurry of an aramid fiber (Twaron RD-1094 from TEIJIN LIMITED, average fiber length: about 1.3 mm, 625 g) was used as the fiber component.

(3) Sample 3

A 1% pulp slurry (LBKP, CSF=500 mL, average fiber length: about 0.7 mm, 1300 g) and barium hydroxide octahydrate (from Wako Pure Chemical Industries, 57 g) were mixed with stirring using a Three-One Motor agitator (800 rpm), and then aluminum sulfate (77 g) was added dropwise at a rate of 2 g/min using a peristaltic pump. After completion of the dropwise addition, stirring was continued for 30 minutes to give Sample 3.

(4) Sample 4

A 2% pulp slurry (LBKP/NBKP=8/2, CSF=390 mL, average fiber length: about 1.3 mm, solids content 25 kg) and barium hydroxide octahydrate (from NIPPON CHEMICAL INDUSTRIAL CO., LTD., 75 kg) were thrown into a vessel (machine chest, internal volume: 4 m³) and mixed, and then aluminum sulfate (98 kg) was added dropwise at a rate of about 500 g/min using a peristaltic pump. After completion of the dropwise addition, stirring was continued for 30 minutes to give Sample 4.

(5) Sample 5

An aqueous suspension containing a 1% pulp slurry (LBKP, CSF=490 mL, average fiber length: about 0.7 mm, 1500 g) and barium hydroxide octahydrate (from Wako Pure Chemical Industries, 140 g) was provided. A 45-L cavitation system was charged with 14 L of this aqueous suspension and sulfuric acid (from Wako Pure Chemical Industries, 1280 g of a 2% aqueous solution) was added dropwise into the reaction vessel at a rate of 50 g/min using a peristaltic pump while the reaction solution was circulated.

During the synthesis of the complex, cavitation bubbles were generated in the reaction vessel by injecting the reaction solution into the reaction vessel while circulating it, as shown in FIG. 1. Specifically, cavitation bubbles were generated by injecting the reaction solution through a nozzle (nozzle diameter: 1.5 mm) under high pressure at an injection rate of about 70 m/s, an inlet pressure (upstream pressure) of 7 MPa and an outlet pressure (downstream pressure) of 0.3 MPa.

After completion of the dropwise addition of sulfuric acid, the pressure in the reaction vessel was released to stop the generation of cavitation, and the reaction solution was continually circulated in the system for 30 minutes to give Sample 5.

<Evaluation of the Complexes>

Each complex slurry obtained (3 g on a solids basis) was filtered through a filter paper under suction, and then the residue was dried in an oven (105° C., 2 hours) and the weight ratio of fiber:inorganic particles in the complex was determined.

Each complex sample was washed with ethanol, and then observed with an electron microscope (FIGS. 36 to 40). The results showed that the inorganic material covered the fiber surface and spontaneously adhered to it in each sample. The barium sulfate adhered to the fiber was plate-like, and the barium sulfate particles had the primary particle sizes shown in the table below.

TABLE 3-1

| Sample | Fiber | Fiber:inorganic particles (weight ratio) | Primary particle size of Ba sulfate (nm) | Average primary particle size of Ba sulfate (nm) |
|---|---|---|---|---|
| 1 | LBKP/NBKP | 56:44 | 200-1500 | 500 |
| 2 | Aramid fiber | 56:44 | 200-2000 | 800 |
| 3 | LBKP | 62:38 | 20-800 | 100 |
| 4 | LBKP/NBKP | 27:73 | 50-1000 | 80 |
| 5 | LBKP | 55:45 | 50-1000 | 100 |

Experiment 7-2: Preparation and Evaluation of Complex Sheets (1) Sample 1 and Sample 2

Each complex obtained in Experiment 7-1(1) and Experiment 7-1(2) (Sample 1 and Sample 2) was filtered through a filter paper under suction, and then the residue was dispersed in tap water to prepare a slurry having a concentration of about 0.2%. This slurry was disintegrated in a standard disintegrator as defined by JIS P 8220-1: 2012 for 5 minutes, and then passed through a 150-mesh wire to prepare a handsheet having a basis weight of 60 g/m² according to JIS P 8222: 1998.

Figure 41:
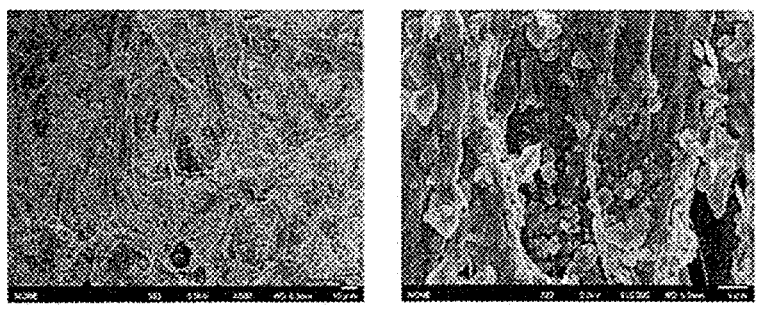
FIG. 41 shows electron micrographs of a sheet prepared from a complex of barium sulfate and a pulp fiber (Sample 7-1) (magnification: left 500×, right 10000×).
Figure 42:
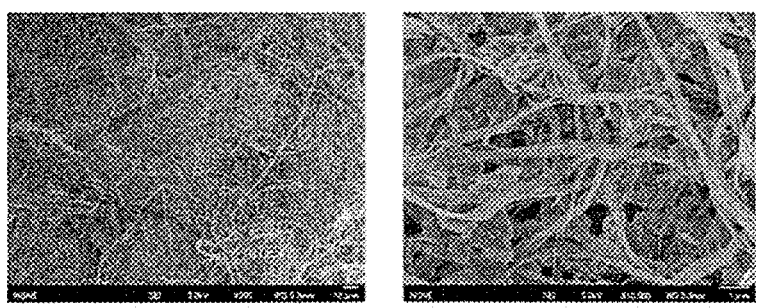
FIG. 42 shows electron micrographs of a sheet prepared from a complex of barium sulfate and a pulp fiber (Sample 7-2) (magnification: left 500×, right 10000×).

The resulting handsheet was analyzed by electron microscopic observation and ash content determination. As seen from the results shown in FIG. 41 (Sample 1) and FIG. 42 (Sample 2), electron microscopic observation of the surface of the handsheet demonstrated that the inorganic material firmly adhered on its own to the fiber surface.

(2) Sample 4

To the complex obtained in Experiment 7-1(4) (Sample 5, concentration: 1%) was added 100 ppm each on a solids basis of a cationic retention aid (ND300 from HYMO CORPORATION) and an anionic retention aid (FA230 from HYMO CORPORATION) to prepare a stock slurry. Then, a sheet was prepared from this stock slurry using a Fourdrinier machine under the conditions of a machine speed of 10 m/min. As control, a sheet was prepared using a Fourdrinier machine from a pulp slurry (LBKP/NBKP=8/2, CSF=390 mL, average fiber length: 1.3 mm) containing 100 ppm each on a solids basis of a cationic retention aid (ND300 from HYMO CORPORATION) and an anionic retention aid (FA230 from HYMO CORPORATION).

Figure 43:
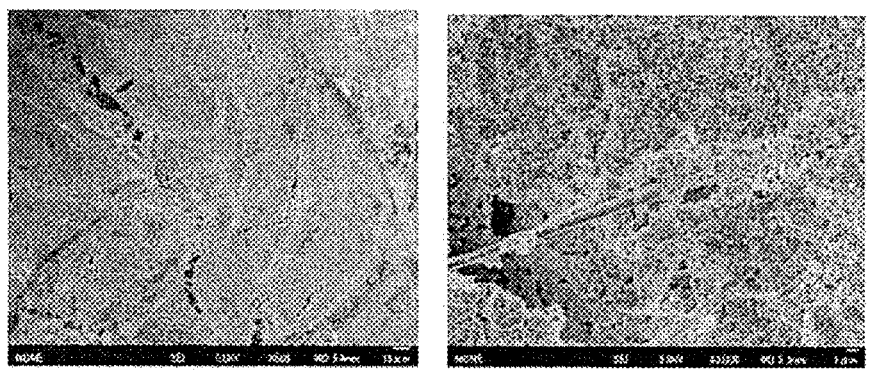
FIG. 43 shows electron micrographs of a sheet prepared from a complex of barium sulfate and a pulp fiber (Sample 7-4) (magnification: left 500×, right 3000×).

Electron microscopic observation of the resulting complex sheet showed that the surface and inside of the paper were closely covered and filled with barium sulfate (FIG. 43).

The properties of the complex sheet were determined and the results are shown in table below. The use of the complex as a raw material made it possible to prepare a sheet having an ash content of about 67% using a paper machine and to continuously take up the resulting sheet in a roll. In this process, both stock retention and ash retention were as high as 96% or more. Further, the resulting complex sheet had higher opacity, density and air resistance as compared with the sheet formed of a pulp alone.

<Evaluation Methods>
Basis weight: JIS P 8124: 1998
Thickness: JIS P 8118: 1998
Density: calculated from the measured thickness and basis weight
Ash content: JIS P 8251: 2003
Brightness: JIS P 8212: 1998
Opacity: JIS P 8149: 2000
Specific scattering coefficient: calculated by the equation defined in TAPPI T425 (ISO 9416)
Air resistance: JIS P8117: 2009
Smoothness: JIS P 8155: 2010
L&W bending stiffness: The bending stiffness was measured at a bending angle of 15° according to ISO-2493 using L&W Bending Tester (from Lorentzen & Wettre)
Breaking length: JIS P 8113: 2006.

TABLE 3-2

|  |  |  | Complex | KP alone |
|---|---|---|---|---|
| Complex | Barium sulfate | % | 73 | — |
|  | LBKP | % | 22 | 80 |
|  | NBKP | % | 5 | 20 |
| Paper properties | Basis weight | g/m² | 179 | 144 |
|  | Density | g/m3 | 1.12 | 0.64 |
|  | Ash content | % | 66.9 | 0.4 |
|  | Brightness | % | 91.5 | 81.2 |
|  | Opacity | % | 96.0 | 92.5 |
|  | Specific scattering coefficient | m2/kg | 63 | 38 |
|  | Air resistance | sec | 75 | 17 |
|  | Smoothness | sec | 11 | 4 |
|  | PPS roughness | μm | 8.7 | 10.3 |
|  | L&W bending stiffness (corrected) | μN · m | 21 | 173 |
|  | Specific tear strength | mN/(g/m2) | 1.9 | 11.2 |
|  | Breaking length | km | 1.2 | 5.9 |
|  | Elongation | mm | 0.7 | 1.5 |
| Retention | Stock retention | % | 97.0 | — |
|  | Ash retention | % | 96.5 | — |

Experiment 7-3: Evaluation of the Radiation Shielding Ability of the Complex Sheet The radiation (X-ray) shielding ability of the complex sheet prepared in Experiment 7-2 (2) was evaluated. Specifically, the transmitted X-ray dose rate and the lead equivalent were determined according to JIS Z 4501 "Testing method of lead equivalent for X-ray protective devices".

(Transmitted X-Ray Dose Rate)

Specimens were irradiated with X-ray beams using the radiation quality and arrangement defined by the testing method of JIS Z 4501, and the transmitted X-ray dose rate was measured. Each specimen was measured five times in each position, from which the average and standard deviation were determined. The dose reduction rate was calculated by the equation below from the transmitted dose rate obtained.

Dose reduction rate (%)=(Transmitted dose rate of each sample/Transmitted dose rate of a blank (without sample))×100

(Lead Equivalent)

The transmitted X-ray dose was measured and the lead equivalent was determined according to JIS Z 4501 "Testing method of lead equivalent for X-ray protective devices". The lead equivalent of each sample was determined by preparing an attenuation rate curve from standard lead plates. The attenuation rate curve was prepared from the attenuation rates of four standard lead plates having different thicknesses by secondary interpolation. The standard lead plates chosen included two lead plates having a higher attenuation rate, and two lead plates having a lower attenuation rate than the attenuation rate of each specimen.

(Measurement Conditions)

X-ray equipment: MG-452 model from YXLON International (smoothing circuit, focal spot size 5.5 mm, Be window);
X-ray tube voltage and tube current: MG-452 model 100 kV 12.5 mA, added filter 0.25 mm Cu;
X-ray tube focus-to-specimen distance: 1500 mm;
Specimen-to-detector distance: 50 mm;
Measuring instrument: the ionization chamber-based radiation dosimeter RAMTEC-1000D model A-4 probe from TOYO MEDIC CO., LTD.;
Units in X-ray dosimetry: collision kerma in air;
X-ray beam: narrow beam.

TABLE 3-3

| Number of layers | Basis weight (g/m2) | Thickness (mm) | Lead equivalent (mm) | Dose reduction rate (%) |
|---|---|---|---|---|
| 1 | 180 | 0.16 | — | — |
| 10 | 1800 | 1.6 | 0.07 | 44.6 |
| 20 | 3600 | 3.2 | 0.14 | 66.3 |
| 40 | 7200 | 6.4 | 0.31 | 85.2 |

As shown in the table, the X-ray dose reduction rate could be increased to 44.6%, 66.3% and 85.2% when 10 pieces, 20 pieces and 40 pieces of the present sheet were layered, respectively. Further, the lead equivalents were 0.07 mm, 0.14 mm, and 0.31 mm when 10 pieces, 20 pieces and 40 pieces were layered in the same manner, respectively.

The invention claimed is:

1. A complex of a cellulose fiber and inorganic particles, wherein 40% or more of the surface of the cellulose fiber is covered by the inorganic particles, wherein the complex does not include a binder, wherein the inorganic particles are at least partially a metal salt of silicic acid, barium or aluminum or metal particles containing titanium, copper or zinc, and wherein the inorganic particles of the complex are synthesized in a solution in the presence of the fiber.

2. The complex of claim 1, wherein the inorganic particles have an average primary particle size of 1 μm or less.

3. The complex of claim 1, wherein the inorganic particles have an average primary particle size of 200 nm or less.

4. The complex of claim 1, wherein the inorganic particles have an average primary particle size of 100 nm or less.

5. The complex of claim 1, wherein the weight ratio between the cellulose fiber and the inorganic particles is 20/80 to 80/20.

6. The complex of claim 1, wherein the cellulose fiber is a wood-derived cellulose fiber.

7. The complex of claim 1, wherein the cellulose fiber is a wood-derived pulp fiber.

8. The complex of claim 1, wherein the cellulose fiber is a chemical pulp.

9. The complex of claim 1, wherein the cellulose fiber is a pulverized cellulose.

10. The complex of claim 1, wherein the inorganic particles are barium sulfate.

11. A radiation shielding material comprising the complex of claim 10.

12. A process for preparing the complex of claim 1, comprising synthesizing inorganic particles in a solution in the presence of a fiber.

13. The complex of claim 1, wherein the complex consists essentially of the cellulose fiber and the inorganic particles.

14. The complex of claim 1, wherein the complex consists of the cellulose fiber and the inorganic particles.

* * * * *